United States Patent [19]
Matsui et al.

[11] Patent Number: 5,742,326
[45] Date of Patent: Apr. 21, 1998

[54] FOCUS ADJUSTABLE IMAGE READING DEVICE FOR CALCULATING A FOCUS POSITION OF A SOURCE DOCUMENT

[75] Inventors: Kumiko Matsui, Yokohama; Hidehisa Tsuchihashi; Takahiro Ikeda, both of Tokyo; Toru Ochiai, Matsudo; Seiichi Morimatsu; Masashi Tazawa, both of Kawasaki; Toshiya Aikawa, Yokohama; Eisaku Maeda, Sakura, all of Japan

[73] Assignee: Nikon Corporation, Tokyo, Japan

[21] Appl. No.: 717,615

[22] Filed: Sep. 20, 1996

Related U.S. Application Data

[63] Continuation of Ser. No. 313,904, Sep. 28, 1994, abandoned.

[30] Foreign Application Priority Data

| Sep. 28, 1993 | [JP] | Japan | 5-241049 |
| Oct. 20, 1993 | [JP] | Japan | 5-262091 |
| Oct. 27, 1993 | [JP] | Japan | 5-291375 |
| Oct. 27, 1993 | [JP] | Japan | 5-291377 |

[51] Int. Cl.[6] ............. B41J 2/47; B41J 2/435; G01D 15/34; G01D 15/24
[52] U.S. Cl. ............. 347/257; 347/262
[58] Field of Search ............. 347/256, 257, 347/258, 262, 242, 241

[56] References Cited

U.S. PATENT DOCUMENTS

| 4,131,782 | 12/1978 | Einstein et al. | 347/243 L |
| 4,732,473 | 3/1988 | Bille et al. | 356/237 |
| 5,008,684 | 4/1991 | Kurafuji | 347/197 |
| 5,146,087 | 9/1992 | Van Dusen | 347/104 |

*Primary Examiner*—Benjamin R. Fuller
*Assistant Examiner*—Raquel Yvette Gordon
*Attorney, Agent, or Firm*—Oliff & Berridge PLC

[57] ABSTRACT

An image reading device and method for producing a uniformly focused light image on a source document includes a document mount, an imaging device, and a drive assembly for moving at least one of the mounting device and the imaging device in a secondary scanning direction. The image reading device includes a control circuit for establishing multiple designated positions on the source document in the primary scanning direction and in the secondary scanning direction and for calculating the focus position from a signal output from the imaging device for the multiple designated positions. A cam member can be provided to adjust the position of the document mount along the optical axis of the light striking the document, a cam surface of the cam member contacting the document mount.

39 Claims, 24 Drawing Sheets

FOCUS ADJUSTABLE IMAGE READING DEVICE FOR CALCULATING A FOCUS POSITION OF A SOURCE DOCUMENT

This is a Continuation of application Ser. No. 08/313,904 filed Sep. 28, 1994, now abandoned.

BACKGROUND OF THE INVENTION

1. Field of the Invention

The present invention relates to an image reading device for use in reading the image of a document, such as, for example, a source document such as 35 mm film, for easily focusing the image in a wide range. The present invention relates to such image input devices that read the image of a source document using light that has passed through or been reflected from the source document.

2. Description of Related Art

FIG. 13 is an example of a prior art image reading device in which the image of a 35 mm film source document is read. In FIG. 13, the source document 2 is held in a film mount and maintained in a film holder 5. The source document 2 is illuminated by a specified illumination light source 1. The image of the source document 2 is formed on a light receiving surface, which can be, for example, a charge-coupled-device line sensor (CCD) 4 after passing through a composition lens 3, such as a photographic lens that focuses the image onto the CCD. The film holder 5 may be moved in a plane across the optical axis by a scanning transport screw 6, which is rotated by stepping motor 7. Furthermore, the photoelectric elements of CCD 4 are arranged to extend in the primary scanning direction so as to be in a line substantially perpendicular to the direction of movement of the film holder 5.

The stepping motor 7 and the photoelectric elements of CCD 4 are controlled by control circuit 10, which passes signals through the respective stepping motor drive circuit 11 and the timing producing circuit 12. The image signal output of the CCD 4 is converted into digital form by A/D converter 9 after being amplified by the amplifier 8, and, along with the positional data of the stepping motor 7, is input to control circuit 10.

The control circuit 10 intermittently causes the film holder 5 to move through the action of the operating stepping motor 7. The image signal output from the CCD 4 following each movement are taken in as digital data. The data is received by the control circuit 10 and stored in memory 13. This data is output, when necessary, to an external device through interface 14, where it can be utilized as intended in the form of image data.

A source document attached to the image reading device described above has a strong tendency to curve. Furthermore, the shape of the film mounts may individually vary. As a result, the focal point position may vary with changes in the source document being read. If the degree of depth of the focal point of the device optics is sufficiently deep, then the amount of variance of the position of the focal point with each source document may be maintained within the focal point depth, making it unnecessary to focus following the reading of each image. However when the device is miniaturized, the optical distance of the optical reading system is compressed and the degree of depth of the focal point cannot be made sufficiently large. Additionally, the focal point becomes shallow when accelerating the reading rate, even when the diameter of the diaphragm of the optical system is great. It is necessary to focus following each reading of the image when the focal point depth is not sufficiently large.

In order to address this problem, Japanese laid-open patent application No. 4-198929 discloses an image reading device having an optical system that forms the image of the original source document on the light receiving surface of photoelectric elements. The device also includes a focal point adjustment mechanism for adjusting the focal point position of the optical system, a detection system for detecting the focal point of the source document, and a focal point adjustment mechanism for positioning the film source document at the time of reading the image with a deep focal point in the optical system.

The prior art system for detecting the focus position of the source document uses a designated point at a single location or in a narrow range on the source document in order to determine the focusing of the image reading device. The focal point adjustment is accomplished so that the film surface in the vicinity of the designated point will be in the depth of the focal point of the system optics.

However, depending upon the state of the source document there is a possibility that positions outside of the designated point are not within the depth of focus of the optic system. As a result, there is the problem that a uniformly focused image will not be obtained across a wide range.

Alternatively, the prior art uses the data read from a single line in order to determine the focus position. The detection of the focus position is based upon image data of the entire indicated single line. The focal point adjustment mechanism then positions the film surface so that the image is in focus when it is being read in the vicinity of the indicated single line.

However, as detailed above, the film source document has strong curvature characteristics. As a result, when the film is moved in the secondary scanning direction (i.e., by motor 7 in FIG. 13), it is possible for the film to curve so much that the degree of depth of the focal point is exceeded. Accordingly by using a single line to determine the focus position, the proper focal point may not exist within the indicated single line for positions on the film spaced away from the indicated single line in the secondary scan direction, in which case an adequately focused image cannot be obtained. In addition, if the user requires a focused image in a specific position, simply indicating the line within a focused parameter will not be adequate.

Furthermore, depending upon the picture quality or condition of the image to be read, there may be the problem that the focus position in the indicated vicinity cannot be detected, making it impossible to read.

The body of an image input device includes an illuminator for guiding illuminating light to the surface of an original document. A scanner containing a carriage supports and moves the original document to be scanned. Light that has passed through or been reflected by the original is formed into an image on a line sensor (CCD). Light from the illuminator is focused so that it is linear on the surface of the original, and after passing through or being reflected from the original is formed into an image on the CCD, which is read as one line of data. After one line has been read, the scanner moves by an amount equivalent to one line, thereby changing the position of the original, and the reading process is repeated. By repeating this reading and movement numerous times, scanning of a single original can be accomplished.

As a conventional image input device structured as described above, Japanese laid-open patent application No. 3-145881 discloses a structure having a support body with an insertion opening formed on the surface through which the film (i.e. the transparent original) is inserted. A conveyor capable of reciprocal movement conveys the source document backward from the film insertion opening. The image input device includes an optical reading mechanism having an optical axis and at least one reading component perpendicular to the direction of conveyance of the conveyor. The carriage in the conveyor that supports and moves the source document moves along and is guided by a pair of fixed shafts. This arrangement makes focus adjustment impossible in the direction of the optical axis of the light that passes through the source document. This does not present a problem if the film is completely flat, but the device cannot handle film that is curled.

Furthermore, the source document is pressed against the carriage by plate springs. The emulsified surface of the source document is capable of moving because of variations in the thickness of the film mounts and variance existing in the position of the emulsified surface. As a result, it is difficult to hold the source document in the correct, flat focusing position.

Finally, detecting the origin position of the film holding carriage in the direction of the optical axis with an image input device where focus adjustment is possible requires an optical sensor or a mechanical switch (such as a limit switch), etc. However, this is expensive, and in addition, it is necessary to have sufficient space with which to attach the optical sensor or mechanical switch.

SUMMARY OF THE INVENTION

It is an object of embodiments of the present invention to provide an image reading device with which an image can be obtained that is uniformly focused across a wide range.

It is another object of embodiments of the present invention to provide an image reading device in which a focused image can be obtained at a designated point or within designated parameters indicated by the user.

It is another object of embodiments of the present invention to provide an image reading device which, when it is impossible to read the image of the film at the currently established designated position, or within designated parameters, then it is possible to focus at a designated position or at a designated parameters previously established.

In order to achieve the above and other objects, according to one aspect of the present invention, there is disclosed an image reading device for producing a uniformly focused image on a source document. The image reading device includes a composition lens for forming an image on a source document. Photoelectric elements electrically convert light of the image from the composition lens. The photoelectric elements are arranged in a line that extends in what is known as a primary scanning direction. A drive assembly moves at least one of the photoelectric elements or the source document in a secondary scanning direction that is perpendicular to the primary scanning direction. A control circuit establishes multiple designated positions on the source document in the primary scanning direction and in the secondary scanning direction from which to determine the focus position. These designated positions can be specified as multiple designated points in the primary scanning direction and in the secondary scanning direction, or as a designated range (of points) in the primary scanning direction and in the secondary scanning direction, or as a single designated point in the primary scanning direction and in the secondary scanning direction. The control circuit also calculates a focus position, for example, by determining an amount of defocus based on an electric signal output from the photoelectric elements at the multiple designated positions. The focus position can be calculated from an electric signal output from the photoelectric elements when reading from the multiple designated points, with reference to the multiple designated ranges, or with reference to the single designated point in the primary scanning direction and in the secondary scanning direction. An adjustment mechanism then adjusts the focal point according to the calculated focus position.

According to another aspect of the invention, the control circuit can determine whether a designated defocus amount (or focus position) can be calculated for each of the designated positions. If the focus position cannot be calculated for each of the designated positions, then the focus position can be calculated in several ways. First, the drive assembly can move at least one of the photoelectric elements and the source document in a vicinity of the established designated position in the secondary scanning direction. A determination is then made as to whether the focus position can be calculated at this location. Alternatively, a designated range of the designed position in the primary scanning direction is increased and the focus position is calculated by an electric signal output from the photoelectric elements within the increased range of the primary scanning direction. As another alternative, past and present designated positions are recorded in memory and if the focus position cannot be calculated at a current designated position, then the focus position is calculated on the basis of a past designated position stored in memory.

It is another object of embodiments of the present invention to provide an image input device in which focus adjustment is possible in the direction of the optical axis of the reading light that passes through or reflects from the document.

It is another object of embodiments of the present invention to enable auto focusing of light on the source document to be performed during reading of the image of a source document and in which auto focusing can be performed without origin detection, which requires a limit switch or similar device.

In order to achieve the above-described objects, according to other aspects of the present invention, an image reading device includes an adjustable source document holder. The source document holder holds and moves the source document within the image reading device. At least a pair of guide rods guide the reciprocal movement of the source document holder. A source document position adjustment assembly moves the guide rods in the direction of the optical axis to accomplish focus adjustment. The source document position adjustment assembly includes a rotatable cam member having a cam surface. The guide rods include an engagement assembly for engaging the cam surface such that the guide rods are moved in the direction of the reading light (i.e. along the optical axis) in response to rotation of the rotatable cam member. The rotatable cam member can be disk shaped. The position of the source document is adjusted by the source document position adjustment assembly by moving the guide rods.

In addition, according to another aspect of the invention, a position detection assembly is provided for detecting the position of the rotatable cam member having the cam surface. By rotating the rotatable cam member until it reaches the in-focus position while detecting the current position of the rotatable cam member, auto focusing can be achieved without origin detection, which requires a limit switch or the like, thereby making it possible to simplify components and reduce costs.

It is another object of embodiments of the present invention to provide a method of uniformly focusing an image on a source document.

The method is performed using an image reading device having a composition lens for forming an image, photoelectric elements for electrically converting light of the image from the composition lens, the photoelectric elements being capable of scanning in a primary scanning direction, and a drive assembly for moving at least one of the photoelectric elements and the source document in a secondary scanning direction perpendicular to the primary scanning direction. The method includes establishing multiple designated positions on the source document in the primary scanning direction and in the secondary scanning direction. Multiple designated positions can be established as multiple designated points having different locations in the primary scanning direction and in the secondary scanning direction, as designated ranges having differing locations in the primary scanning direction and in the secondary scanning direction, or as multiple single designated points having differing locations in the primary scanning direction and in the secondary scanning direction.

A focus position is then calculated (for example, by determining an amount of defocus) from an electric signal output by the photoelectric elements when located at the multiple designated positions. If a designated defocus amount cannot be calculated in the established designated positions, then at least one of the photoelectric elements and the source document is moved in a vicinity of the designated position, or the designated range of the designated position is increased in the primary scanning direction, or past recorded designated positions are used. The amount of defocus is then recalculated. The focal point position is then adjusted based upon recalculated defocus amount.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Embodiments of the image reading device incorporating one or more aspects of the present invention will be described hereafter with reference to the drawings.

Figure 1:
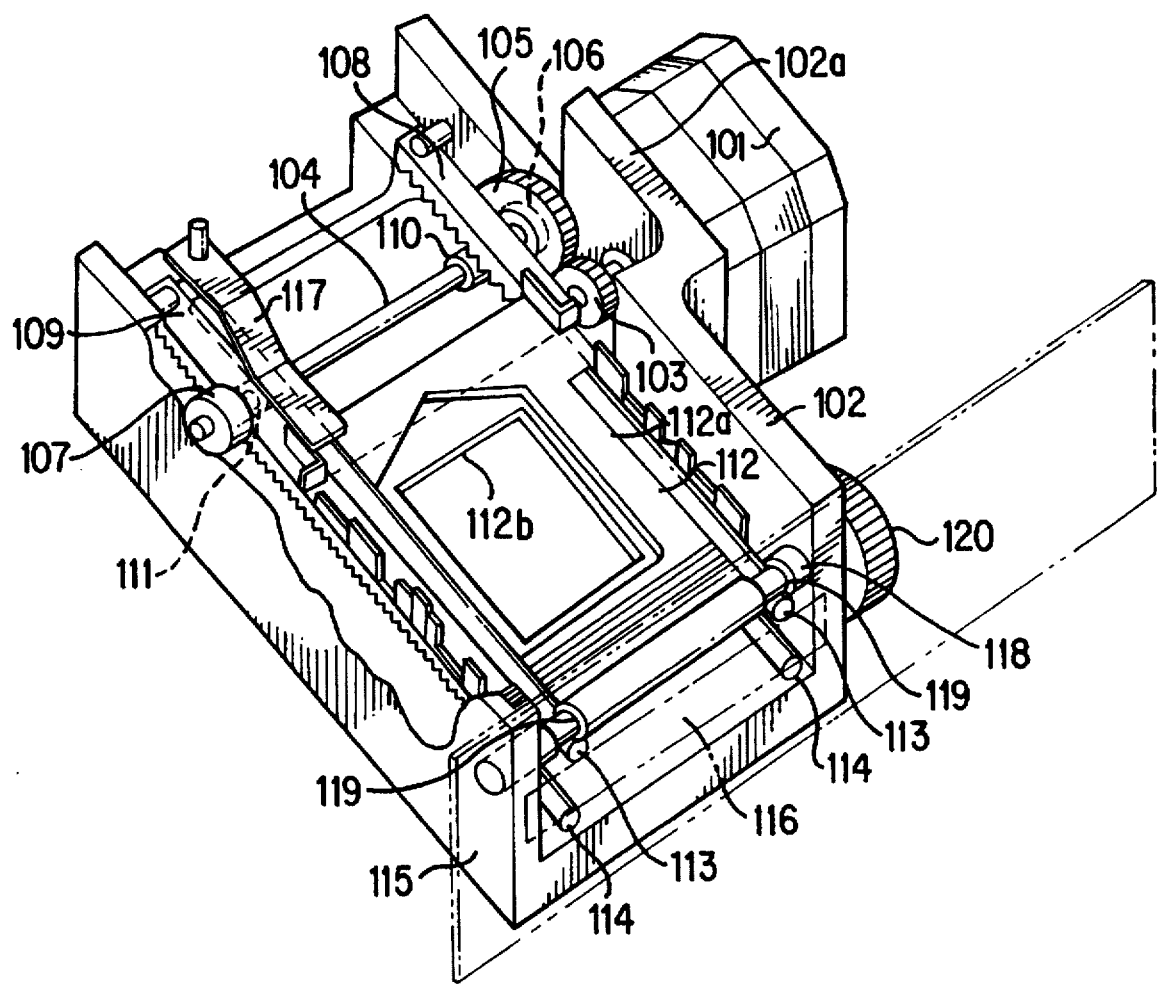
FIG. 1 is a partially broken oblique diagram that shows the composition of a transport mechanism in a first embodiment of the image reading device according to the present invention.
Figure 2:
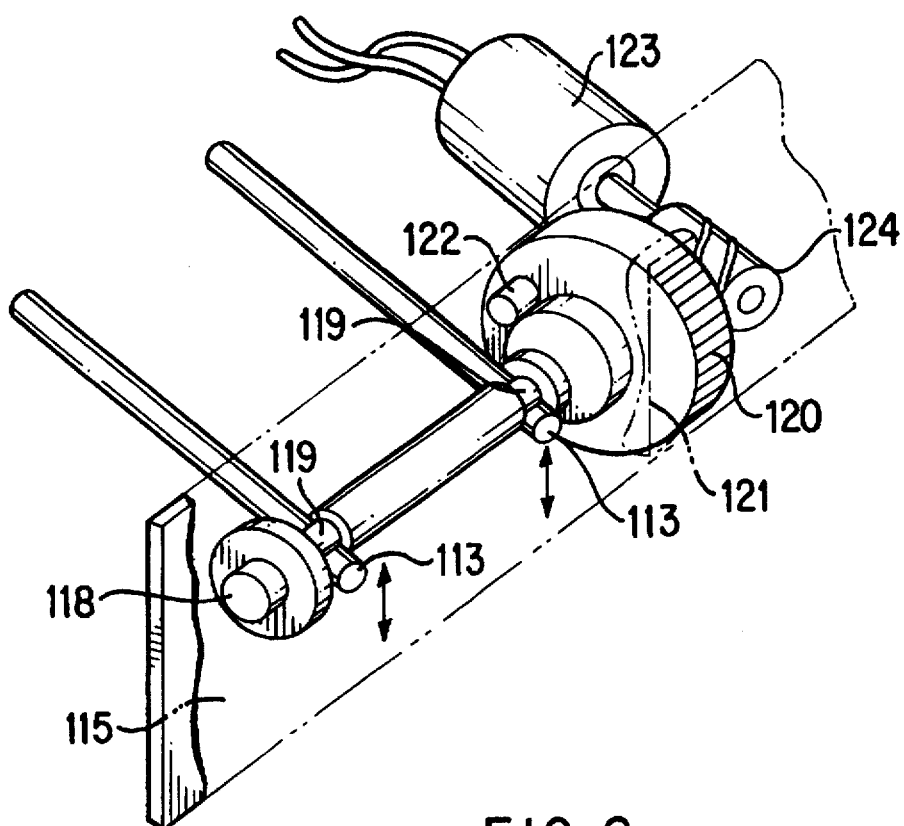
FIG. 2 is a partially broken oblique diagram that shows the composition of a focus adjustment mechanism according to FIG. 1.
Figure 13:
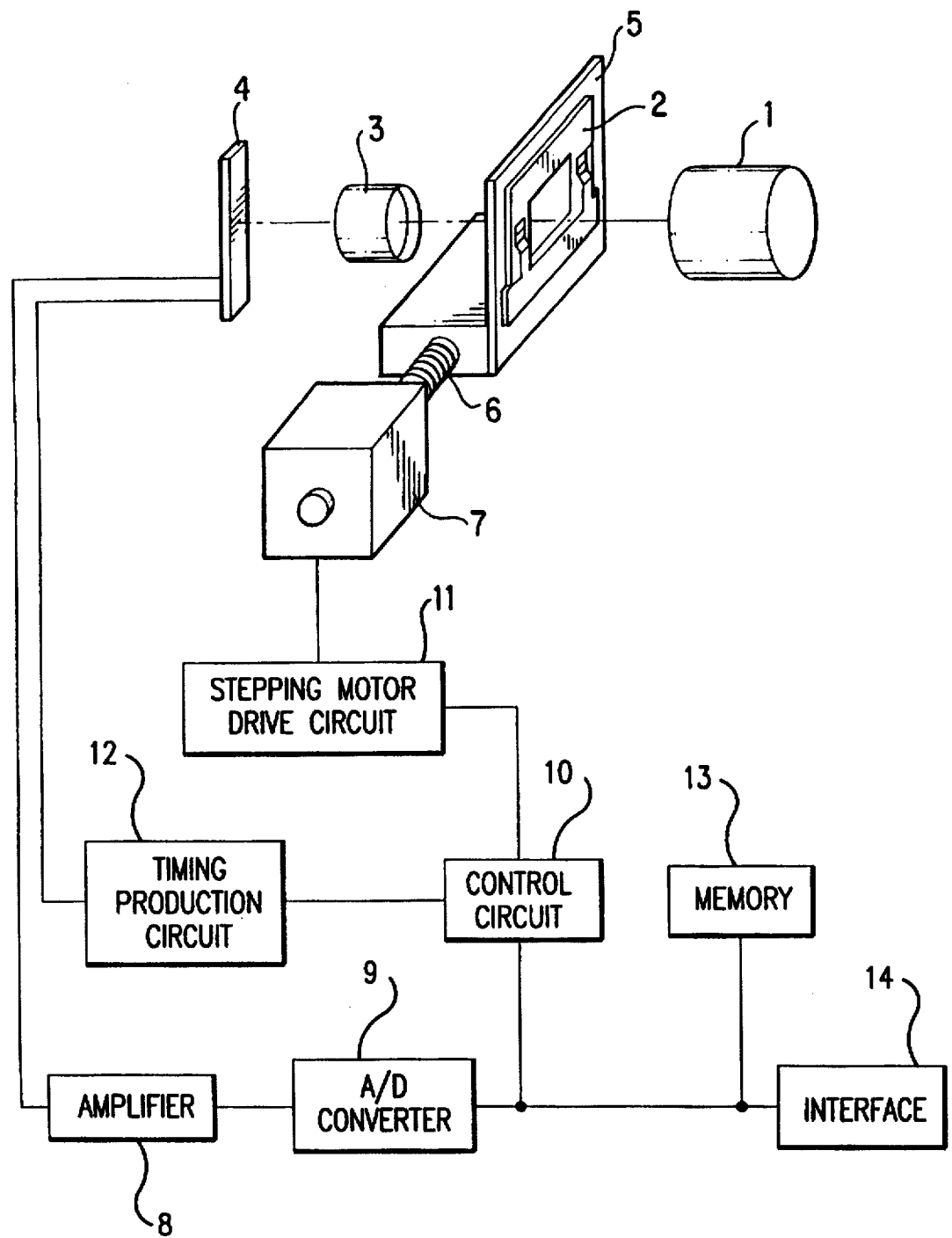
FIG. 13 is an explanatory diagram that shows the composition of an example of a prior art image reading device.

FIGS. 1 and 2 show the construction of an image reading device in accordance with an embodiment of the present invention. In FIG. 1, a conventional stepping motor 101 is secured to a flange 102a of housing 102. The housing 102 houses the image reading device in its entirety. To clarify the drawings, the optical source, each type of mirror, and the electrical components of the various detector arrays, as well as the optical elements, shown in FIGS. 13 and 15 have been eliminated. A small gear 103 is secured to the output shaft of the motor 101. The small gear 103 is enmeshed with the idle gear 105, which is secured to shaft 104. The shaft 104 is arranged in parallel with the output shaft of the motor 101, and is rotationally supported in housing 102 by the set of bearings 106 and 107. In addition, pinions 110 and 111 are respectively enmeshed with a set of racks 108 and 109, which are capable of movement along the length of the shaft 104, the racks 108 and 109 being respectively and integrally coupled to the transport carriage 112.

Transport carriage 112 is reciprocally guided by a lateral single set of upper rods 113 and lower rods 114, which are respectively mounted at a right angle relative to the shaft 104. A front panel 115 is secured to the front surface of the housing 102 and a rectangular opening 116 is formed in the front panel 115 at a position facing the transport carriage 112. One end of the upper rod 113 opposite the front panel 115 is supported by carriage 112. The other end adjacent to the front panel 115 is capable of a small amount of perpendicular (up and down) movement.

The transport carriage 112 is formed from an upper shell 112a and a lower shell 112b, which form a parallel single unit and are slidingly supported on the respective upper rods 113 and lower rods 114 through a bushing type bearing, not shown, to which they are respectively attached. The set of upper rods 113 are pressed downward by means of spring 117 (a portion of which is shown in FIG. 1). The racks 108 and 109 are respectively pressed towards pinions 110 and 111 to become completely engaged. Furthermore, pinions 110 and 111 operate as a pivot axis, which causes the pivoting of racks 108 and 109 respectively.

In FIG. 2, a circular rod type focus cam member 118 is supported so as to freely rotate in housing 102 at a right angle relative to the upper rods 113. The focus cam member 118 includes a laterally spaced set of eccentric depressions 119. One end of each of the lateral upper rods 113 is supported within the depressions 119. A circular plate type focusing knob 120 is attached to one end of the focus cam member 118. A portion of the focus knob 120 protrudes from a slot 121 in the front panel 115. By manually rotating the focus knob 120 protruding from the slot 121, the focus cam member 118 is rotated, so as to adjust the height of the rods 113 through the depressions 119. This causes the carriage 112 to be elevated by the upper rod 113, thereby enabling the elevation of the source document by approximately 1 mm, for example. A stopper 122 controls the rotational limits of the focus knob 120 by engaging the front panel 115.

To facilitate auto focusing, a worm gear 124 (see FIG. 2) driven by stepping motor 123 is connected to the focusing cam member 118 through a conventional abrasion clutch having a pinion (not shown). The pinion is attached to one end of the focusing cam member 118 to rotate the focusing cam member.

Figure 3:
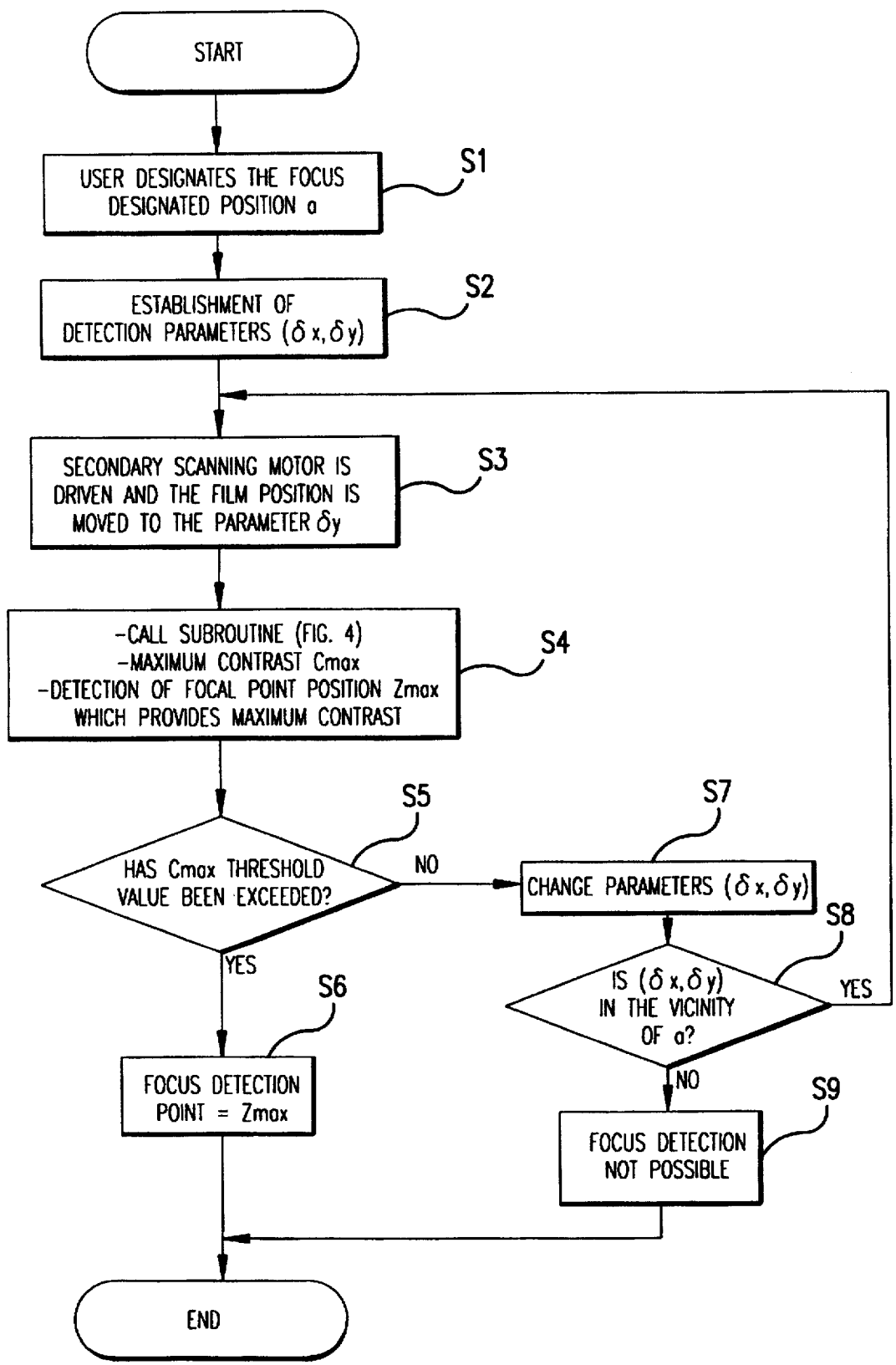
FIG. 3 is a flow chart that shows the focus detection process of a first method of the present invention.

A method for detecting the focal point as the center of a focus designated position, which can be a single point or a single range using the image reading device constructed in the manner described above is explained hereafter with reference to the flow chart shown in FIG. 3.

In step S1 the user designates the focus designated position a. This is a position on the document. This can be accomplished by the user inputting the designated position, for example using a keyboard to designate appropriate coordinate positions. In step S2, the focus detection parameters ($\delta x, \delta y$) that correspond to the focus designated position a designated in step S1 are established. The primary scanning direction is designated as x and the secondary scanning direction is designated as y. An explanation of the method for establishing the focus detection parameters is now provided. In step S3, the stepping motor 101 is driven so as to move the source document in the secondary scanning direction to within the focus detection parameter $\delta y$.

Figure 4:
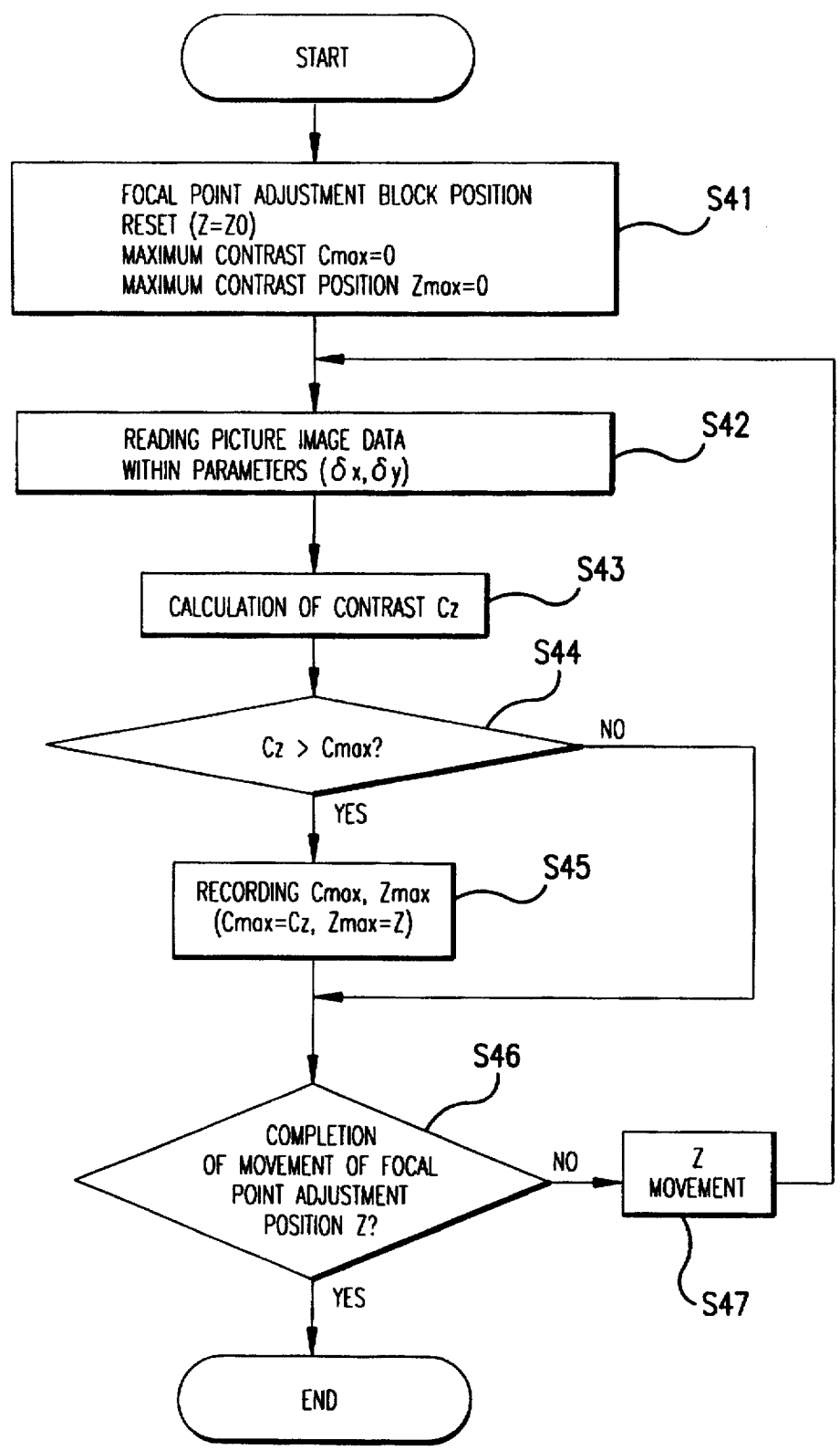
FIG. 4 is a flow chart of a sub-routine that shows the contrast detection process of FIG. 3.

The output contrast is maximized for each of the photoelectric elements in the CCD; this corresponds to each position on the original source document scanned by the CCD when the original document is located at position $\delta y$. The focus state is determined for these positions. In step S4, the subroutine shown in FIG. 4 is executed to obtain the data indicated in step S4. Referring to FIG. 4, in step S41 the focus cam member 118 is rotated, resetting the focal point adjustment position Z, whereby Z=Z0. At the same time, the values of a focal point adjustment position Zmax, which provides the maximum contrast value Cmax, and the maximum contrast Cmax are reset, whereby Cmax=0 and Zmax=0. In step S42, the line of image data within the focus detection parameters ($\delta x, \delta y$) is read. At this time, the image line lies within the focus detection parameters because of the document carriage movement performed in step S3. Following the termination of the image reading of one line, the stepping motor 101 is driven, changing the secondary scanning position of the source document. The image data then is read across the entire focal detection parameter. The source document is moved in the secondary scanning direction and image data is read until data is read for all values of $\delta x$ and $\delta y$ (as detailed above $\delta x$ and $\delta y$ can each be a single point or a range of points).

In step S43, the contrast Cz is determined for the appropriate images. In step S44, the contrast Cz obtained in step S43 is compared to the maximum contrast Cmax. If Cz is greater than Cmax, then in step S45, Cz becomes the maximum contrast value Cmax, at which time the focal point adjustment position Z (i.e., the position of transport carriage 112 as controlled by the position of the focus cam member 118) is recorded into the recording device as the focal point Zmax.

The focal point adjustment position Z is moved repetitively in steps S42–S45 (i.e., until the output of step S46 is YES as detailed below). In step S46, it is determined if the movement of the focal point adjustment position Z has been completed. If the movement is not complete, then in step S47, the focal point adjustment position Z is moved to the next position (i.e., by rotating focus cam member 118), returning to step S42, and repeating the same chronology. Furthermore, in step S44, if the contrast Cz is not the maximum contrast, then the contrast value Cz and the focal point adjustment position Z at that time are not recorded.

In step S46, if it is determined that all of the steps relating to the movement of the focal point adjustment position Z have been completed, then the focal point adjustment position Z recorded into the recording device in step S45 becomes the focal point Zmax. Thus, measurement of the contrast Cz is continued until all of the movement steps of the focal point adjustment position Z are completed. However, it is not absolutely necessary to perform all of the steps, and measurements can be terminated at the point in time at which the value of the contrast Cz exceeds a designated value, at which point the position can be held, and designated as the focal point Zmax.

Returning to the flow chart shown in FIG. 3, in step S4, the focal point adjustment position Zmax determines the position that achieves the maximum contrast value Cmax and the maximum contrast. In step S5, it is determined if the maximum contrast value Cmax has exceeded the focus detection threshold value Cth. If the maximum contrast value Cmax has exceeded the focus detection threshold value Cth, then in step S6 the focal point becomes Zmax and focus detection is terminated. If the Cmax has not exceeded the threshold value Cth, then in step S7, the focus detection parameters ($\delta x, \delta y$) are changed. In step S8, a determination is made as to whether the focus detection parameters lie in the vicinity of the focus designated position a. If the parameters are proximate, then step S3 is repeated. If the parameters fall outside of the proximity, then in step S9, focal point detection in the vicinity of the focus designated position a is regarded as being impossible, and the focus detection process is terminated.

In step S9, where focus detection is impossible, it is necessary to achieve a state in which reading can be accomplished of the source document image (i.e., a focal point adjustment position needs to be established). An explanation of such a case is provided hereafter, with reference to the flow chart shown in FIG. 8. In step S101, it is determined whether the focus designated position of a source document read previous to the source document for which focus detection was not possible is available. If so, then in step S102, the focus designated position of the source document that was read prior to the value of the film source document for which focus detection was not possible, is taken as the focus designated position for the film source document for which focus detection was not possible, on the basis of which focal point adjustment is performed.

When a user continuously performs reading of source documents, the user usually utilizes the same type of film mount. When utilization is made of the same film mount, there is a high probability that the position of the focal point will not greatly change.

In step S101, if no source document has been read prior to the reading for which focus detection of the film is not possible, then in step S103, an adjustment is made to the focal point position for which a designated value has been established immediately beforehand. Furthermore, in step S101, where a source document exists that has been read immediately beforehand, the designated positions may be utilized in the accomplishment of focal point adjustment.

Figure 5:
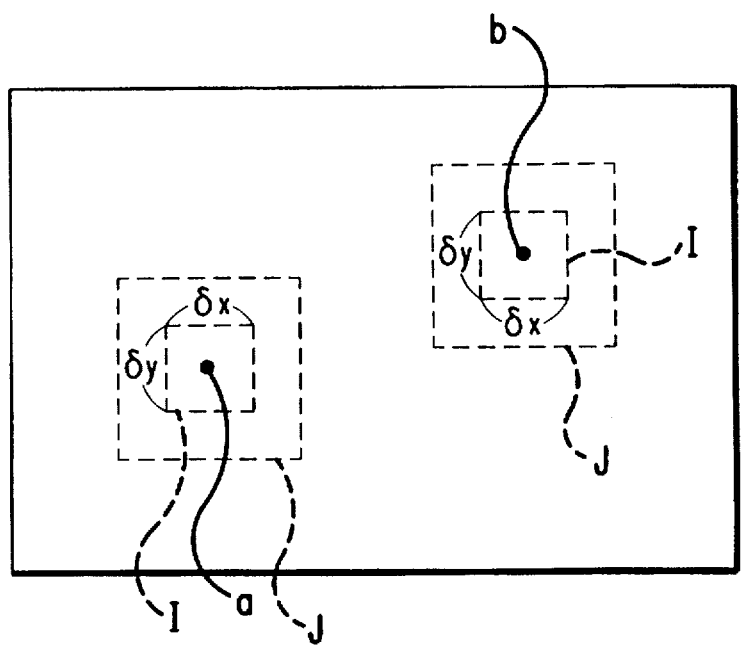
FIG. 5 is an explanatory diagram that shows two individual focus designated position according to an embodiment of the present invention.
Figure 6:
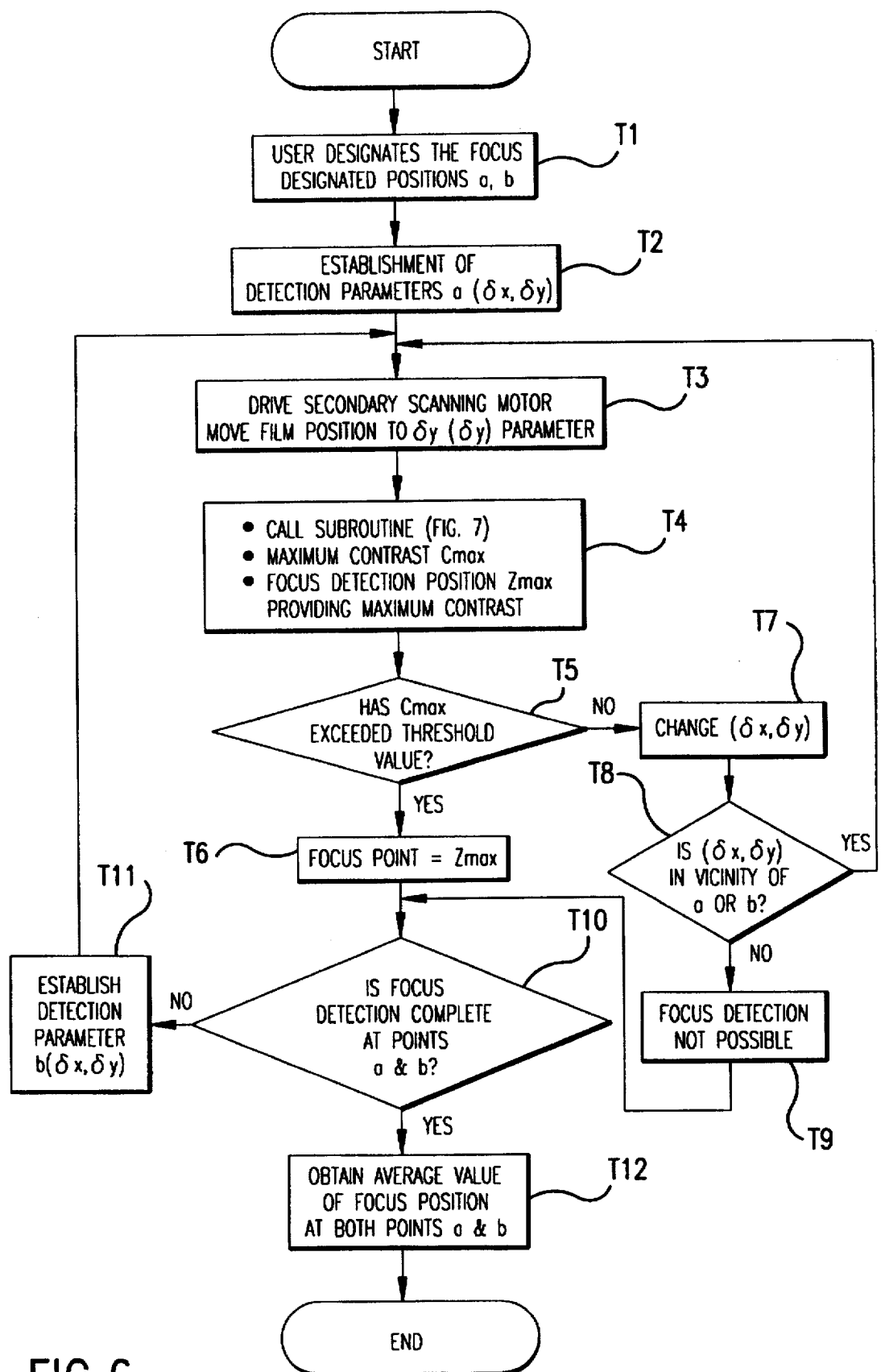
FIG. 6 is a flow chart that shows the focus detection process of a second method of the present invention.
Figure 7:
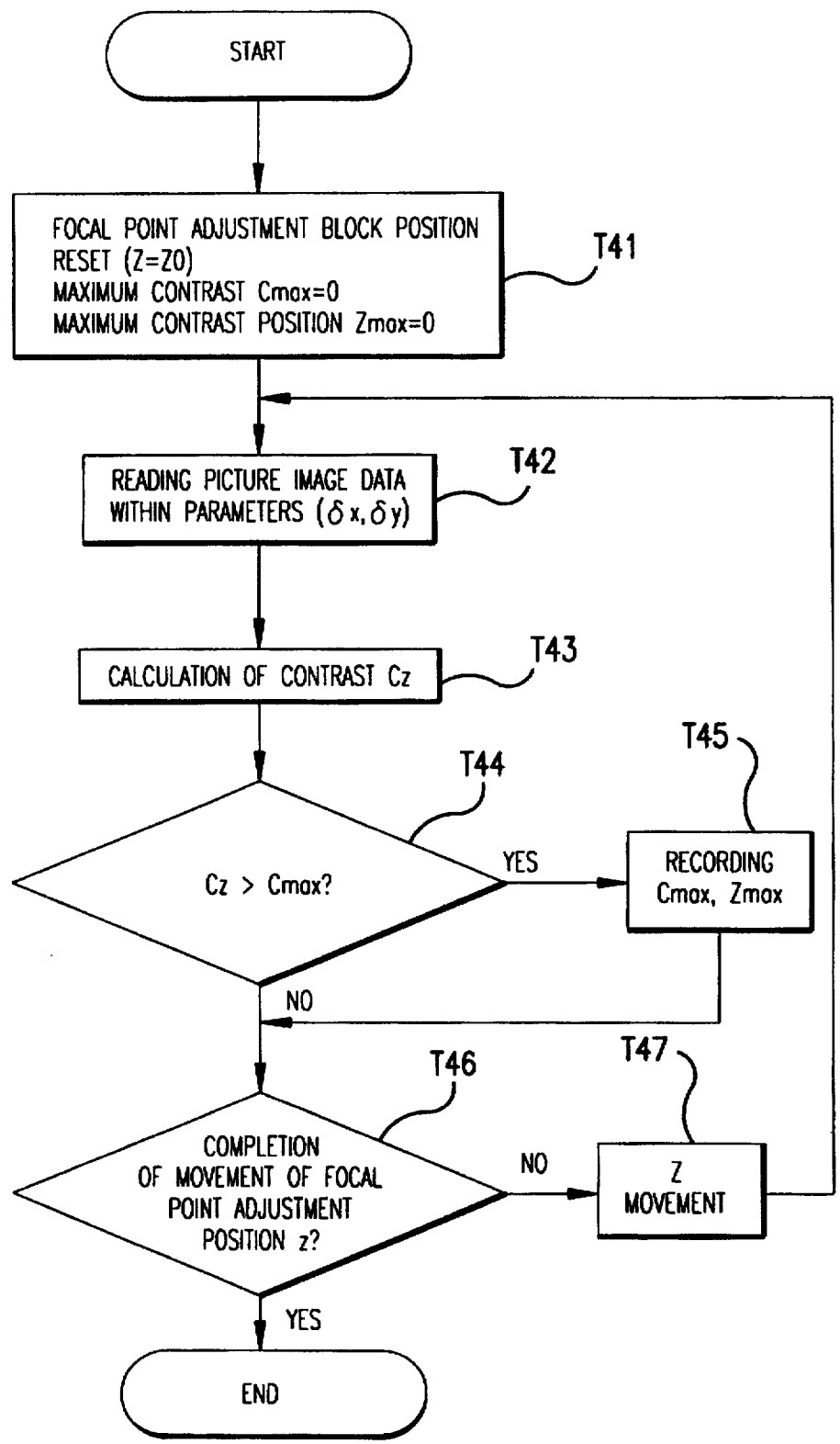
FIG. 7 is a flow chart of a subroutine that shows the process for detecting the contrast.

A method for accomplishing focus detection using the image reading device constructed in the manner described, wherein the focus designated position or the focus designated parameters are indicated by two locations a and b, shown in FIG. 5, is explained hereafter with reference to the flow chart shown in FIG. 6.

In step T1, the user designates the two focus designated positions a and b in a similar manner to that set forth in step S1 above. In step T2, the primary scanning direction being designated as x and the secondary scanning direction being designated as y. The focus detection parameters ($\delta x, \delta y$) are established to correspond with the focus designated position a designated in step T1. In step T3, the stepping motor 101 is driven, moving the position of the secondary scanning direction of the source document to within the focus detection parameters $\delta y$.

In the present embodiment, the output contrast is maximized for each of the photoelectric elements corresponding to the designated position on the original source document. In step T4, the subroutine shown in FIG. 6 is executed. In step T41 the focus cam member 118 is rotated, resetting the focal point adjustment position Z, whereby Z=Z0. At the same time, the value of a focal point adjustment position Zmax, which provides the maximum contrast value Cmax, is reset, and Cmax is reset, whereby Cmax=0 and Zmax=0. In step T42, the line image data within the focus detection parameters ($\delta x, \delta y$) is read. At this time, the image line lies within the focus detection parameters. Following the termination of the image reading of one line, the stepping motor 101 is driven, changing the secondary scanning position of the source document, the image data being read across the entire focus detection parameter, as detailed earlier.

In step T43, the contrast Cz is determined for the designated images. In step T44, the contrast Cz obtained in step T43 is compared to the maximum contrast Cmax. If Cz is greater than Cmax, then in step T45 Cz becomes the maximum contrast value Cmax, and the focal point adjustment position Z is then recorded into the recording device as the focal point Zmax.

The focal point adjustment position Z is moved and steps T42-T45 are repeated for different values of Z. In step T46, a determination is made whether the movement of the focal point adjustment position Z has been completed. If not, then in step T47, the focal point adjustment position Z is moved to the next position, returning to step T42, and repeating the same steps. Furthermore, in step T44, if the contrast Cz is not the maximum contrast, then the contrast value Cz and the focal point adjustment position Z at that time are not recorded.

In step T46, if it is determined that all of the steps relating to the movement of the focal point adjustment position Z have been completed, then the focal point adjustment position Z last recorded into the recording device in step T45 becomes the focal point Zmax. Thus, measurement of the contrast C is repeated until all of the movement steps of the focal point adjustment position Z have been completed. However, it is not absolutely necessary to perform all of the steps, and measurements can be terminated at the point in time at which the value of the contrast Cz exceeds a designated value, at which point the position can be held, and designated as the focal point Zmax.

Returning to the flow chart shown in FIG. 6, in step T4, the focal adjustment point position Zmax determines the maximum contrast value Cmax and the maximum contrast. In step T5, it is determined if the maximum contrast value Cmax has exceeded the focus detection threshold value Cth. If the maximum contrast value Cmax has exceeded the focus detection threshold value Cth then in step T6, the focal point becomes Zmax and focus detection is terminated. If Cmax has not exceeded the threshold value Cth, then in step T7, the focus detection parameters ($\delta x, \delta y$) are changed. In step T8, a determination is made as to whether the focus detection parameters lie in the vicinity of the focus designated position a. If the parameters are proximate, then step T3 is repeated. If the parameters fall outside of this proximity, then in step T9, focal point detection in the vicinity of the focus designated position a is regarded as being impossible, and the focus detection process proceeds to step T10.

In step T10, it is determined whether focus detection at both of the focus designated positions a and b designated in step T1 has been completed. If it is determined that focus detection has only been completed at the focus designated position a, and not at the focus designated position b, then in step T11, a focus detection parameter ($\delta x, \delta y$) is established at the focus designated position point b. Also, returning to step T3, focus detection is accomplished in the same chronology as was the case where the focus designated position was the point a. In step T10, if it is determined that focus detection has been completed at both points a and b, then in step T12, the average value of Zmax for the focus designated positions of both points a and b is obtained.

With regard to the present embodiment, an explanation has been provided with respect to a situation wherein the focus designated positions are the two points a and b. However, the number of multiple points may be greater than two. In addition, where the points are such that focus detection is impossible, then those points may be excluded from the average calculated value of Zmax. As a method for calculating the average value, a simple average may be taken or a method of weighted averages in which applied weights corresponding to each of the focus designated positions may be used. With focus designated positions obtained in this manner, if reading is accomplished of the source document, then an averaged focus can be obtained of the image relative to each focus designated position.

Figure 8:
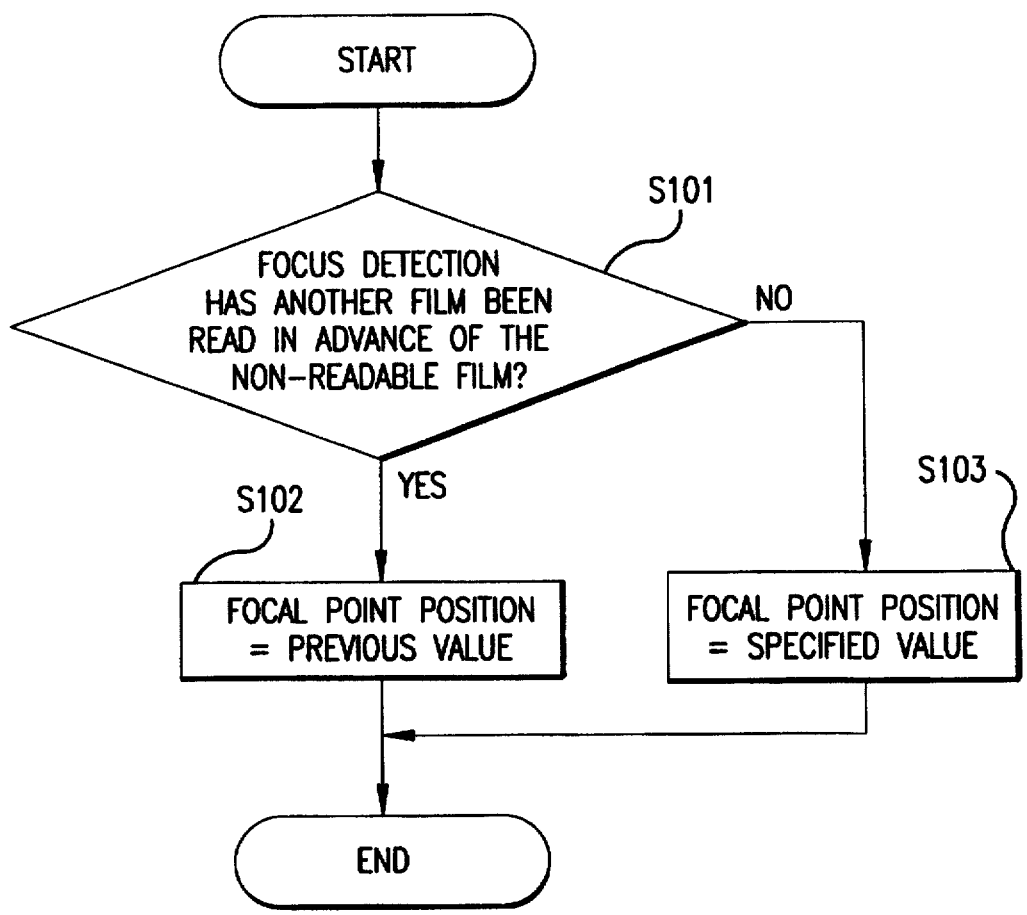
FIG. 8 is a flow chart that shows the process for accomplishing focal point adjustment when a determination is made that focus detection is not possible.

If focus detection is not possible in step T9, then in order to establish conditions in which the image of the film can be read, a focal point adjustment position must be established in some position. In such a situation, the process set forth above in reference to FIG. 8 is followed.

The following discussion of FIGS. 9–12 applies to the methods outlined in the flow charts in FIGS. 3 and 6.

Figure 9:
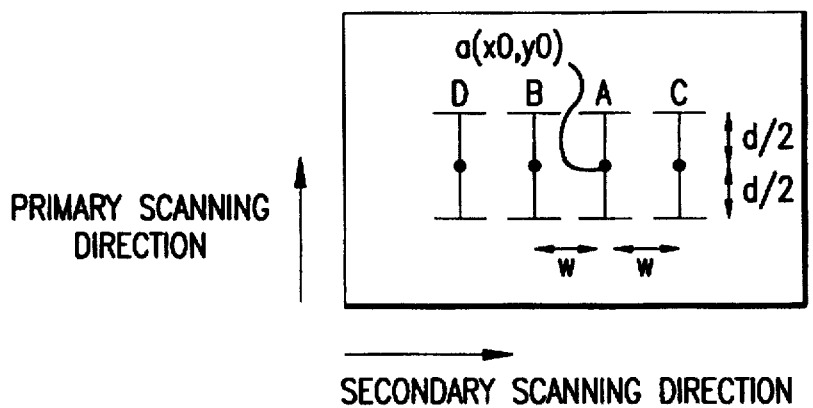
FIG. 9 is an explanatory diagram that shows a first example of the focus designated position, and focus detection parameters as well as their methods for change according to the present invention.

In FIG. 9, the focus designated position is the single point a (x0,y0). The focus detection parameters (δx,δy) are established as (x0±d/2,y=0). In FIG. 9, A identifies the focus detection parameters established in step S2 or step T2. If focus detection within the detection parameters A is not possible, then in step S7 or step T7, the focus detection parameters (δx,δy) are changed to (x±d/2,y0+W), as shown by B. If the focus detection in the detection parameters B is not possible, then the focus detection parameters are changed in the secondary scanning direction to cover areas C and D.

Figure 10:
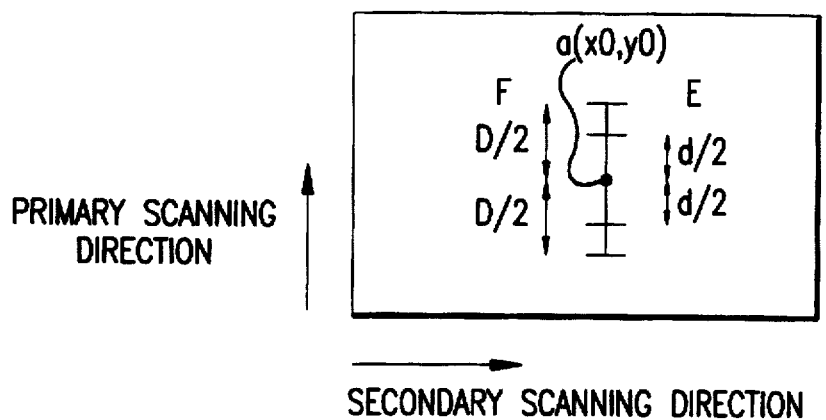
FIG. 10 is an explanatory diagram that shows a second example of the focus designated position, the focus designated parameters and a method for their change according to the present invention.

In FIG. 10, the single point a(x0,y0) is designated as the focus designated position. In FIG. 10, E is defined by the focus detection parameter (x0±d/2,y=0) established in step S2 or step T2. When focus detection is not possible with the focus detection parameter shown by E, then in step S7 or step T7, the focus detection parameters are changed to (x0±D/2,y=0), as shown in F. If the focus detection is not possible in the focus detection parameter shown by F, then through the further increase of the detection parameters in the same primary scanning direction, the focus detection parameters are changed. In the FIG. 10 example, the single point a(x0,y0) is located in the center of the areas E and F.

Figure 11:
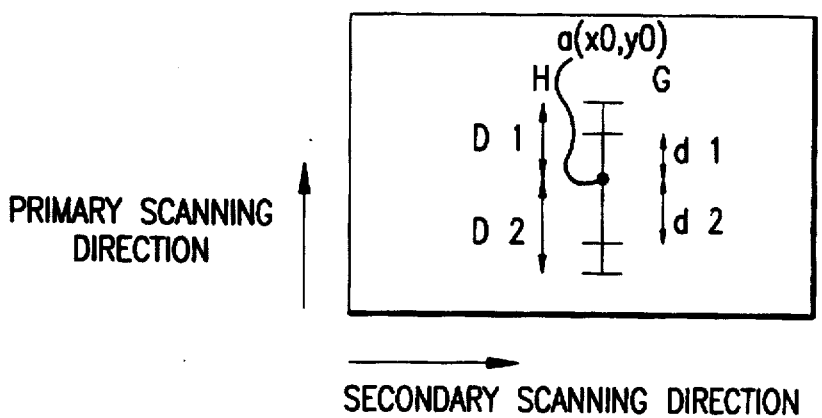
FIG. 11 is an explanatory diagram that shows a third example of a focus designated position, focus detection parameters, and their method for change according to the present invention.

As shown in FIG. 11, the focus detection parameters E and F, shown in FIG. 10, are varied such that the point a(x0,y0) may be increased to G(x0+$d_1$,y=0), (x0−$d_2$,y=0) where the parameters are not laterally symmetrical (i.e., not symmetrical in the primary scanning direction). In addition, it may be established as H($x_0$+$D_1$,$x_0$−$D_2$,y=0). In this instance, the single point a is not designated as the focus designated position, but the user may designate $d_1$,$d_2$ instead. In addition, if the focus designated position a is positioned at the end of the image surface, then by setting either $d_1$, or $d_2$ to 0, focus detection can be accomplished. Furthermore, even if focus detection is not terminated within the focus detection parameter(s) G,H, then the focus detection parameter shown in FIGS. 9 and 10 can be combined to change the parameter.

Figure 12:
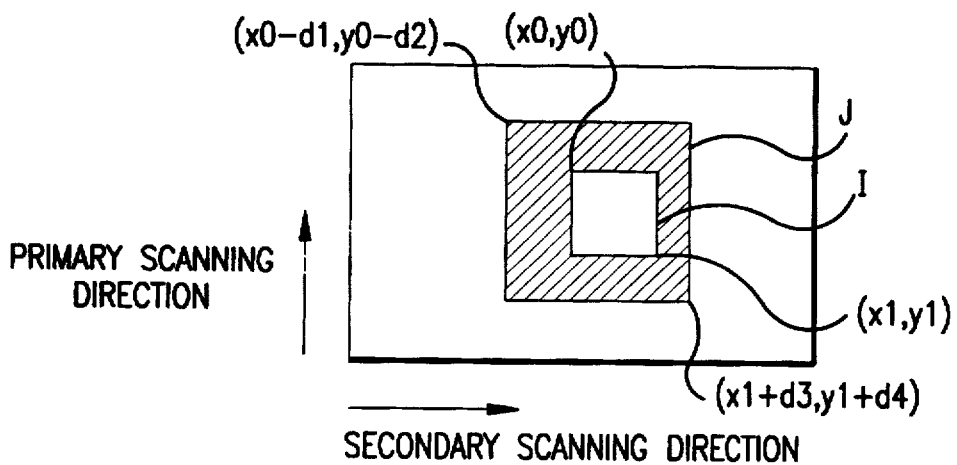
FIG. 12 is an explanatory diagram that shows a fourth example of a focus designated position, a focus detection parameter, and a method for their change according to the present invention.

In addition, if the point a(x0,y0) is not designated as the focus designated position, then as shown in FIG. 12, the parameters (x0,y0) and (x1,y1) can be designated as shown by I. The parameter I may also be used as the focus detection parameter. Furthermore, if focus detection is not possible in the parameter I, then the focus designated region can be enlarged to become the region (x0−d1,y0−d2) (x1+d3,y1+d4), as shown by J. Through the increase of the focus detection parameter in the same manner, the focus detection parameter can be changed further.

The establishment of the focus designated position, and the focus detection parameter, and their changes need not be individually accomplished as shown in FIGS. 9–12, but may also be collectively accomplished.

Furthermore, the establishment of the focus detection parameters shown in FIGS. 9–12 may also be executed in the same manner with respect to the focus designated position b.

According to the present embodiment, when the focus designated positions are two positions a and b (or more than two positions) the average value of the detected focus positions are used to establish the final focal point position of the source document. Accordingly, an average focal point focused image can be obtained when reading the film source document.

According to the methods of the present embodiment, if the user designates a designated point or a designated parameter, since focal point detection can generally take place in the proximity of the designated position, then the designated point is easily obtained as the center of the focused image. In addition, depending upon the quality of the read subject image, there may be occasions in which the focus position cannot be detected in the proximity of the designated position. Even in this case, if the reading of the previous source document is accomplished, utilization may be made of the previous focal point. If this cannot be accomplished then utilization may be made of a designated value, and through the respective adjustment of the focus mechanism, it will be possible to re-read the image of a source document for which focusing was not possible.

With the above embodiment, where utilization is made of the contrast output from a video image for which detection is made of the focal point, an explanation has already been provided. However, other methods for the detection of the focal point may also be utilized. For example, an independent optical system may be attached for focal point detection, and detection may be accomplished by methods that detect phase differences. Methods that simply measure distance, or physical distance measurement sensors may also be utilized rather than the disclosed methods, which determine a defocus amount. Furthermore, with the present embodiment, an explanation has already been provided with regard to the accomplishment of focal point adjustments through the movement of the position of the film source document surface. However, the present invention is not limited to these types of focal adjustment methods, and utilization may also be made of other methods.

In addition, with the above embodiment, the source document was moved in the secondary scanning direction. However, the CCD or the optical system itself may be moved, with the source document remaining stationary.

As explained above, according to the image reading device of the present invention, the user may designate the focus position. Since the focus detection parameters may be established based on this focus designated position, focusing of the image can be easily accomplished using the focus designated position at the center of the focus detection parameters.

In addition, if the focus position cannot be determined in the vicinity of the focus designated position, then utilization may be made of the focal point of the previously read image, or utilization may be made of a pre-designated value on the basis of which focal point adjustment can be accomplished, owing to which it is possible to read the image of a source document for which it was not possible to focus.

Figure 14:
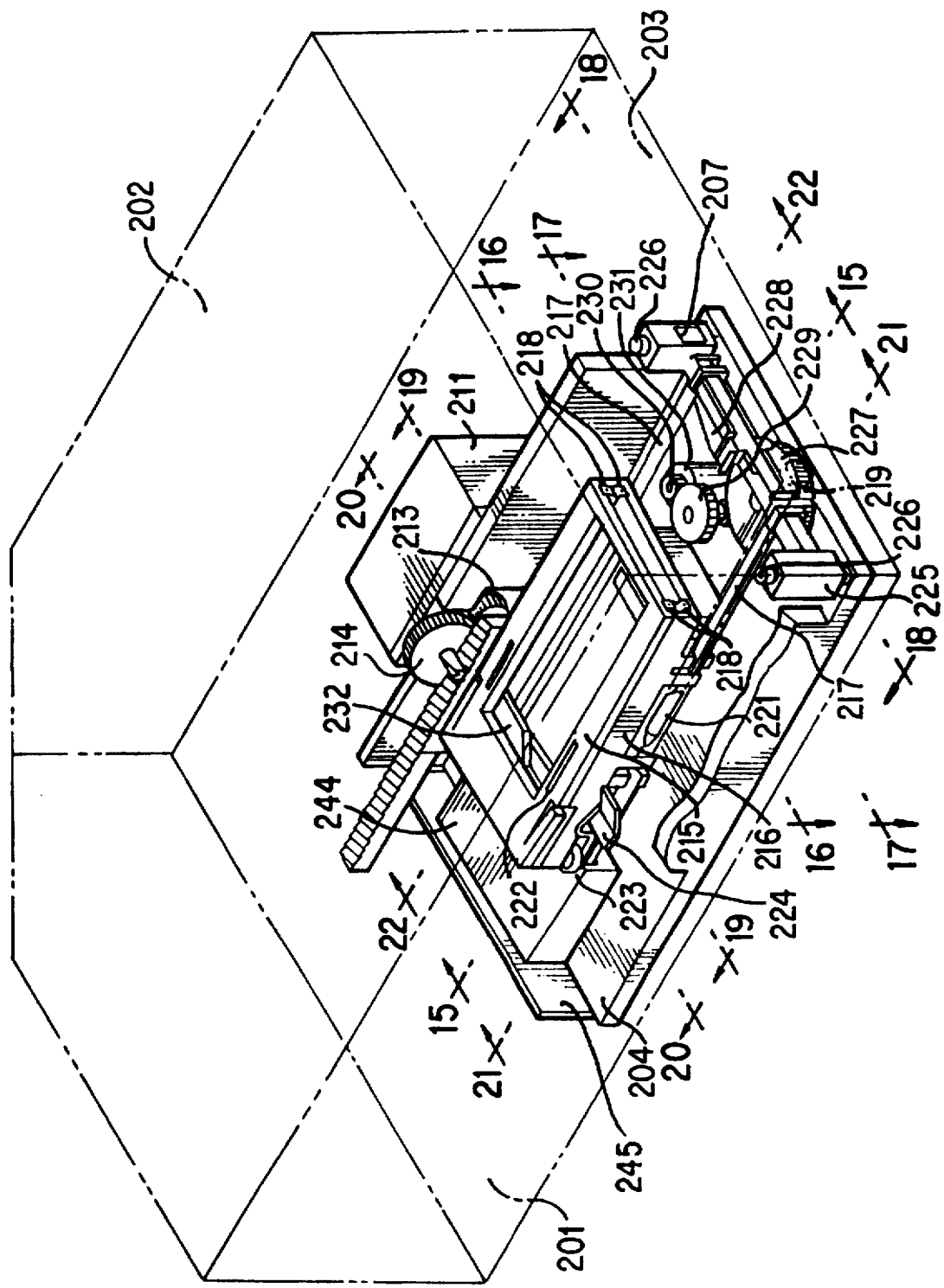
FIG. 14 is an oblique view showing a second embodiment of an image input device according to the present invention.

FIG. 14 shows the construction of an image reading device in accordance with another embodiment of the present invention. In FIG. 14, the image input device includes an optical illumination component for guiding the illuminating light to the surface of the source document, which is a transparent original. A scanning component moves the carriage 215 and 216, supports the source document, and scans the film. A projector optical component (for example, a photographic lens) focuses the light that has passed through the film into an image on a line sensor CCD, which reads the image. These components are housed inside a casing comprised of an aluminum diecast body 201, an aluminum top cover 202, which covers the top of the body 201, and a polycarbonate front panel 203 that covers the front of the body 201. In addition, the main base plate 205 and the mechanical body 204, which house the image reading system comprised of the scanning component, the illuminating optical component and the projector optical component, are attached together with screws. Furthermore, the front of the top cover 202 is held on by the front panel 203, and the back of the top cover 202 is fixed to the body 201 by means of screws, not shown. The image reading system is thus covered by the top cover 202 and the front panel 203.

Figure 15:
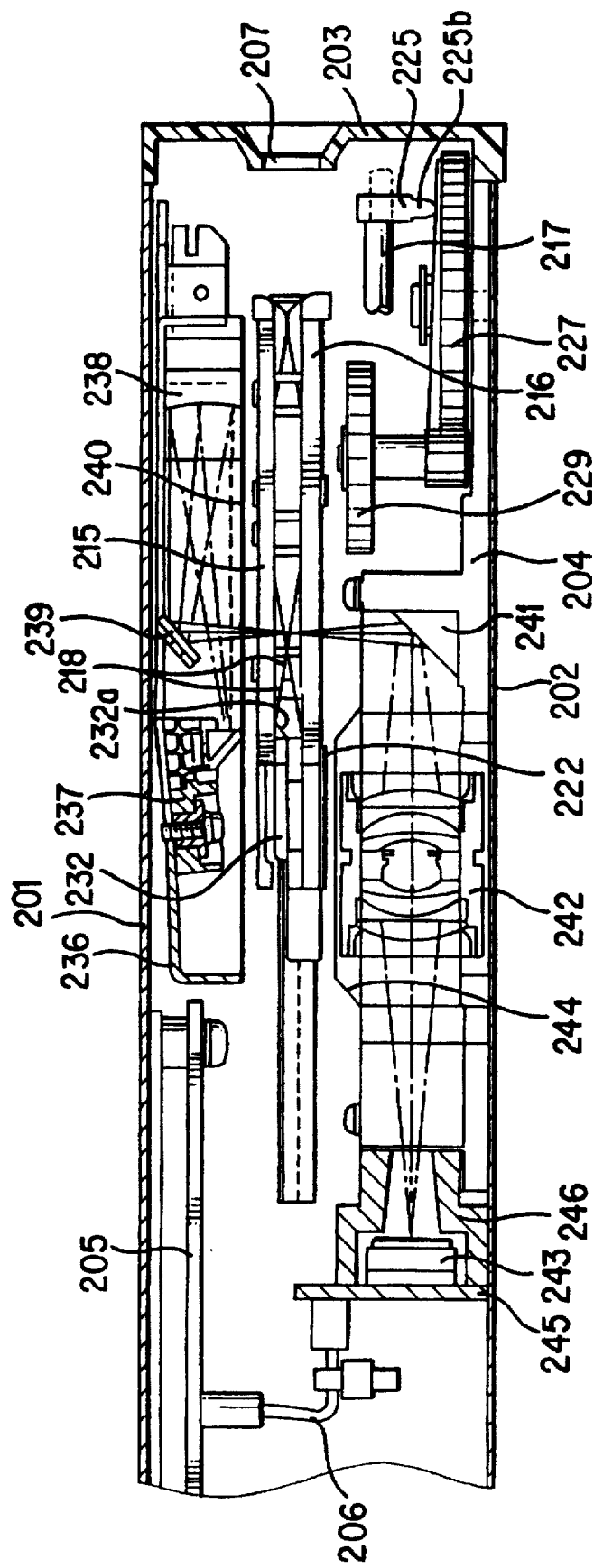
FIG. 15 is a cross-section showing the second embodiment of an image input device according to the present invention, and is taken along the line 15—15 in FIG. 14.

The main base plate 205, shown in FIG. 15, and the mechanical body 204 are connected by four sets of harnesses 206. The front panel 203 is provided with an insertion opening 207 into which the film mount can be inserted and an LED window, not shown, used for status display. The outer rim of a manual focus cam 227 protrudes from the front panel 203, shown in FIG. 14, so that manual focusing operations can be conducted from the front. The focus cam 227 is comprised of a disk-like rotational member that has a cammed surface (i.e., the upper surface). An eject button 219 also protrudes from the front panel 203, so that it is possible to perform the action of ejecting a film mount inserted into the insertion opening 207. The side of the body 201 opposite the front panel 203 includes a large opening. Consequently, it is possible to provide connections to the various connectors provided on the main base plate 205.

The scanning component includes a carriage component having a film mount support, a movement mechanism, a source document alignment mechanism, and a motor having a power transmission mechanism that transmits motor drive power to the carriage component. The motor includes a stepping motor 211, shown in FIG. 14, and a reduction gear 214a formed as a single body with a pinion gear 214 that reduces the revolutions of the stepping motor 211, and is fixed to a motor attachment plate, not shown. The motor attachment plate is fixed by screws to the mechanical body 204.

Figure 16:
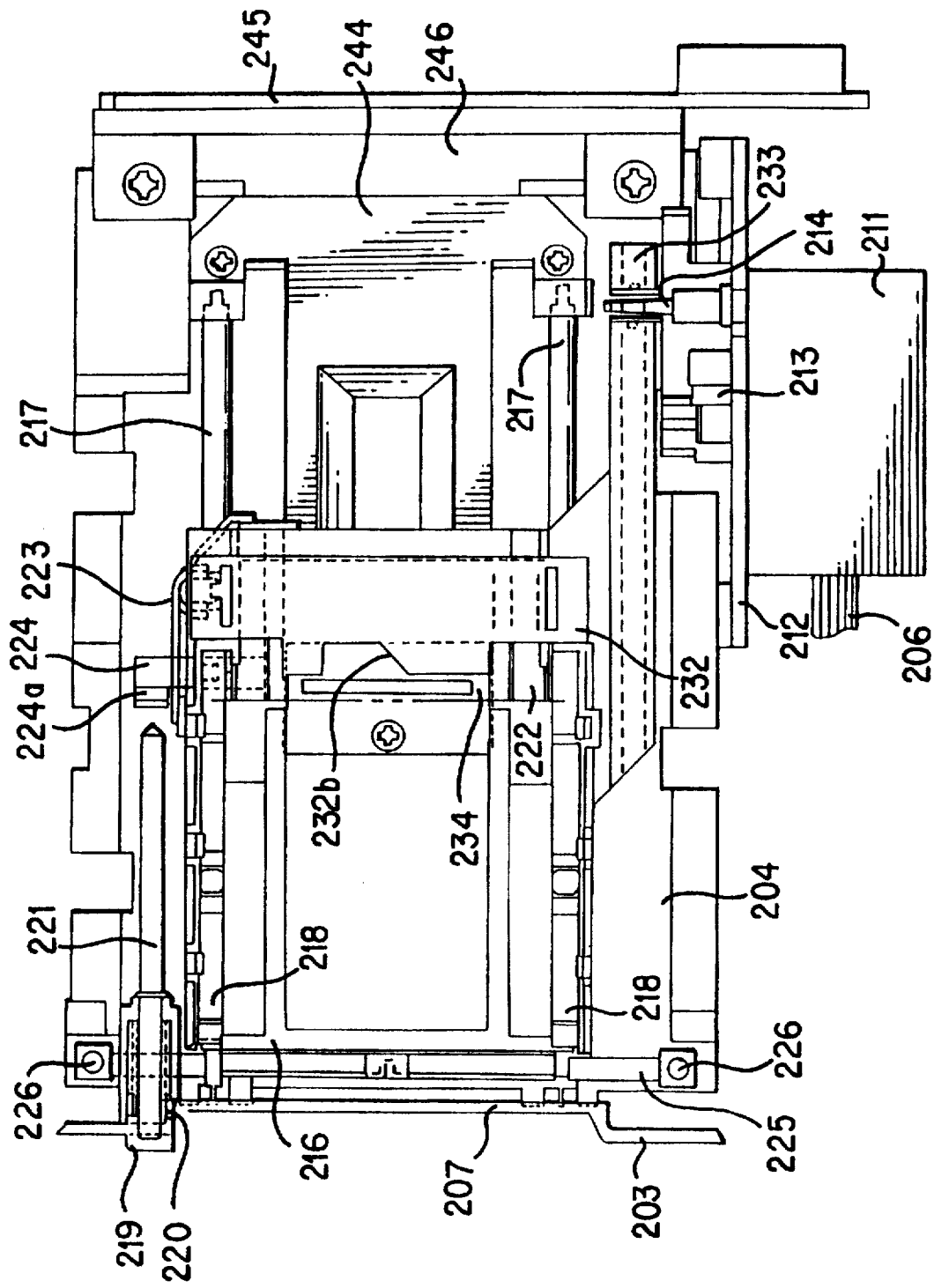
FIG. 16 is a cross section showing the second embodiment of an image input device according to the present invention, and is taken along the line 16—16 in FIG. 14.

The stepping motor 211 is affixed by screws to the motor attachment plate 212, shown in FIG. 16, turns a motor gear 213, which is pressed onto the motor shaft, and turns the pinion gear 214 via the reduction gear. The stepping motor 211 rotates 0.9 times per each single step corresponding to one line of the image.

Figure 17:
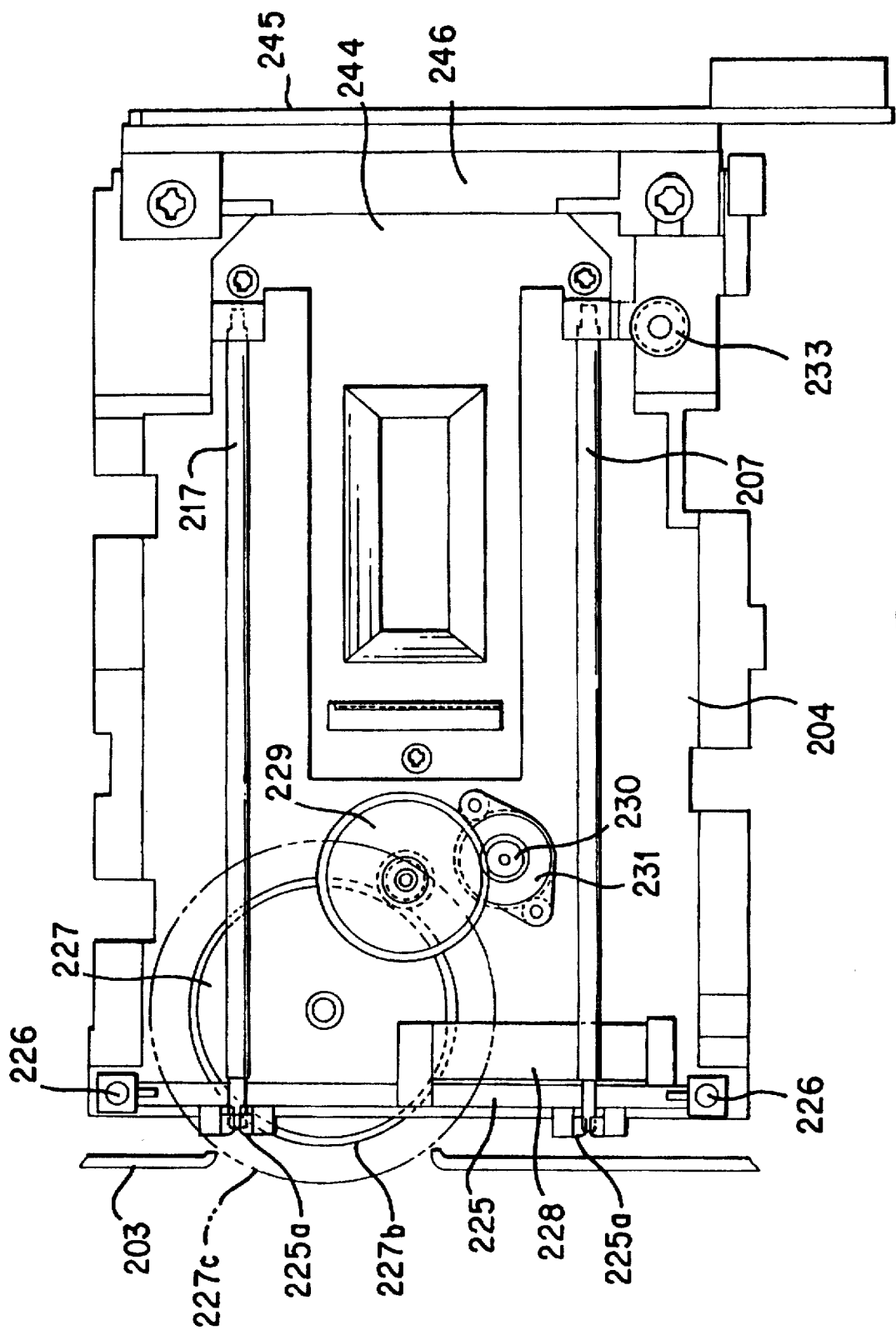
FIG. 17 is a cross section showing the second embodiment of an image input device according to the present invention, and is taken along the line 17—17 in FIG. 14.

The carriage component includes a carriage 215 and a rack carriage 216 arranged opposite each other in a single body with a certain spacing therebetween. The carriage component can move along a pair of parallel guide bars 217, as shown in FIG. 17. The pair of parallel guide bars 217 each have one end inserted into a slot in the mechanical body 204 and the other end inserted into a focus block 225. The edges of the opposing faces of the carriage 215 and the rack carriage 216 are attached to two film suppression springs 218, which contact the film mount that is inserted between the carriages 215 and 216.

The spring force of these film suppression springs 218 is balanced, as a result of which even when carriages having different thicknesses are inserted between the carriages 215 and 216, the film mount is always positioned centrally between the carriage 215 and the rack carriage 216. Because the central location between the carriage 215 and the rack carriage 216 is the position of optical focus, even if the mount thickness varies, focus adjustment can be omitted if the emulsified surface of the film is centrally positioned in the mount, as shown in FIG. 15.

In the rack carriage, a bevel rack 216c is formed parallel to the direction of movement, the pinion gear 214 fitting into the bevel rack 216c, and drive power from the stepping motor 211 being transmitted, thereby moving the carriage 215 and the rack carriage 216.

Figure 18:
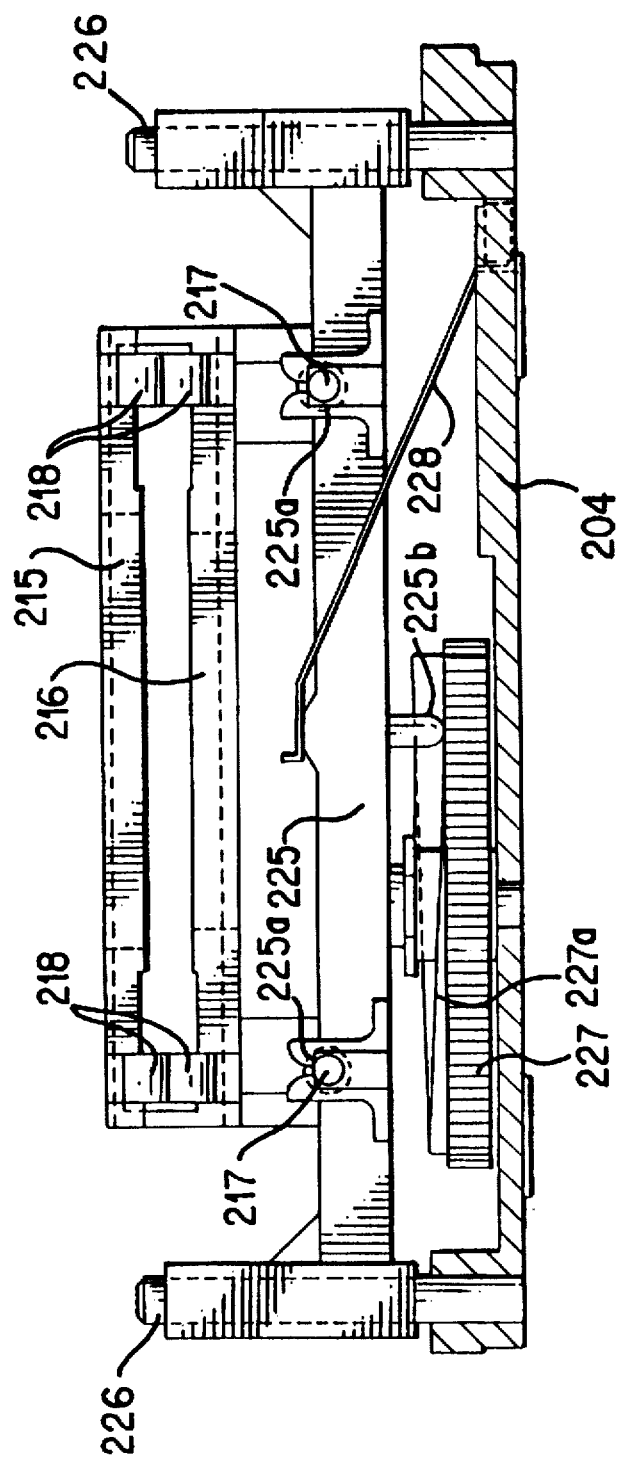
FIG. 18 is a cross section showing the second embodiment of an image input device according to the present invention, and is taken along the line 18—18 in FIG. 14.

The following is a description of the focus adjustment mechanism. Focus adjustment is performed by moving the guide bars 217 up and down. One end of the guide bars 217 is in contact with the focus block 225, and the other end is in contact with the mechanical body 204, and becomes the center of rotational motion, as shown in FIG. 17. Both edges of the focus block 225 are fitted with parallel pins 226 that are attached to the mechanical body 204, allowing motion in the direction of focusing, as shown in FIGS. 14, 16 and 17. A projection 225b having a spherical tip is centered between the two guide bar pressure components 225a of the focus block 225 (FIGS. 17 and 18) and is kept in contact with the focus cam 227 by pressure from the focus block suppression spring 228 (FIGS. 14 and 18). The cam surface 227a of the focus cam 227 is inclined to a height of about 2 mm in the focusing direction, focus adjustment being performed by rotating the focus cam 227. The projection 225b of the focus block 225, which is in contact with the focus cam 227 is centered between the guide bars 217. Consequently, even if there is a shift between the focus block 225 and the parallel pins 226, the guide bars 217 are raised or lowered in the focusing direction without becoming tilted. The image reading position is centered between the guide bars 217, and by changing the position of one end of the guide bars 217 by about +1 mm using the focus cam 227, the reading position can be adjusted by about ±0.5 mm.

A gear is formed on the side surface 227b of the focus cam 227 and is linked to the AF motor gear 230 via an idle gear 229. The AF motor gear 230 is pressed onto the shaft of the AF motor 231, making automatic focusing possible through the rotation of the AF motor 231. To perform manual focusing without using the auto focus mechanism, the AF motor 231 and idle gear 229 are omitted and the gear on the side surface 227b of the focus cam is changed into a roulette or lever protruding from the front panel 203. The focus cam 227 can then be turned by hand making manual focusing possible.

The auto focusing action achieved by rotating the focus cam 227 is explained hereinafter along with FIGS. 26–28b. In addition, when it is not necessary to detect the origin in the auto focusing direction described above, (i.e. when it is not necessary to set the carriage position in the focusing direction to an arbitrary initial position) if the position is shifted about 2 mm in the focusing direction by rotating the focus cam 227 by 360°, all focusing information in the adjustment range can be obtained by rotating the focus cam 227 by 360°. Because of this, auto focusing is possible without detecting the origin in the focusing direction.

Figure 20:
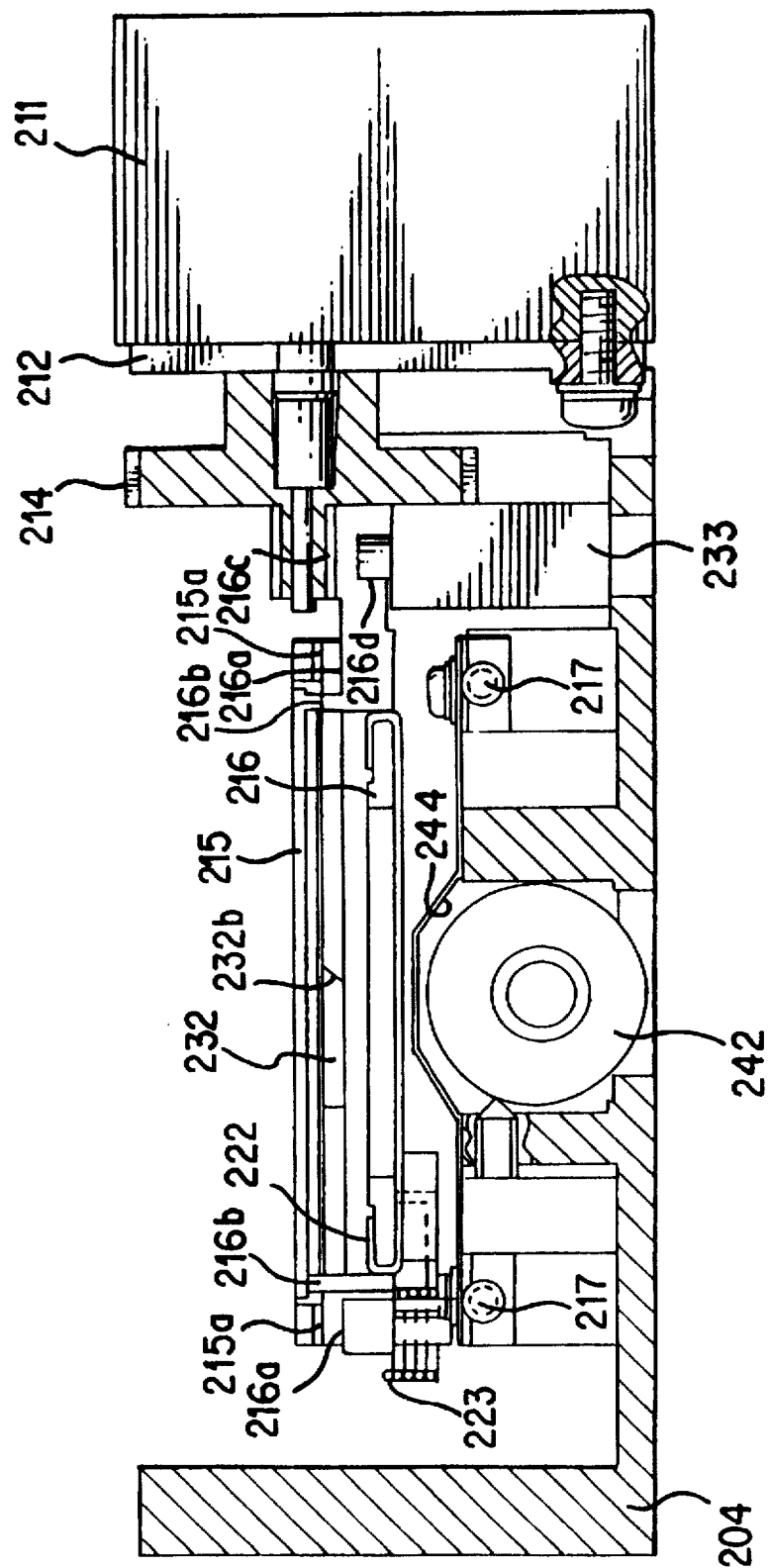
FIG. 20 is a cross section showing the second embodiment of an image input device according to the present invention, and is taken along the line 20—20 in FIG. 14.
Figure 21:
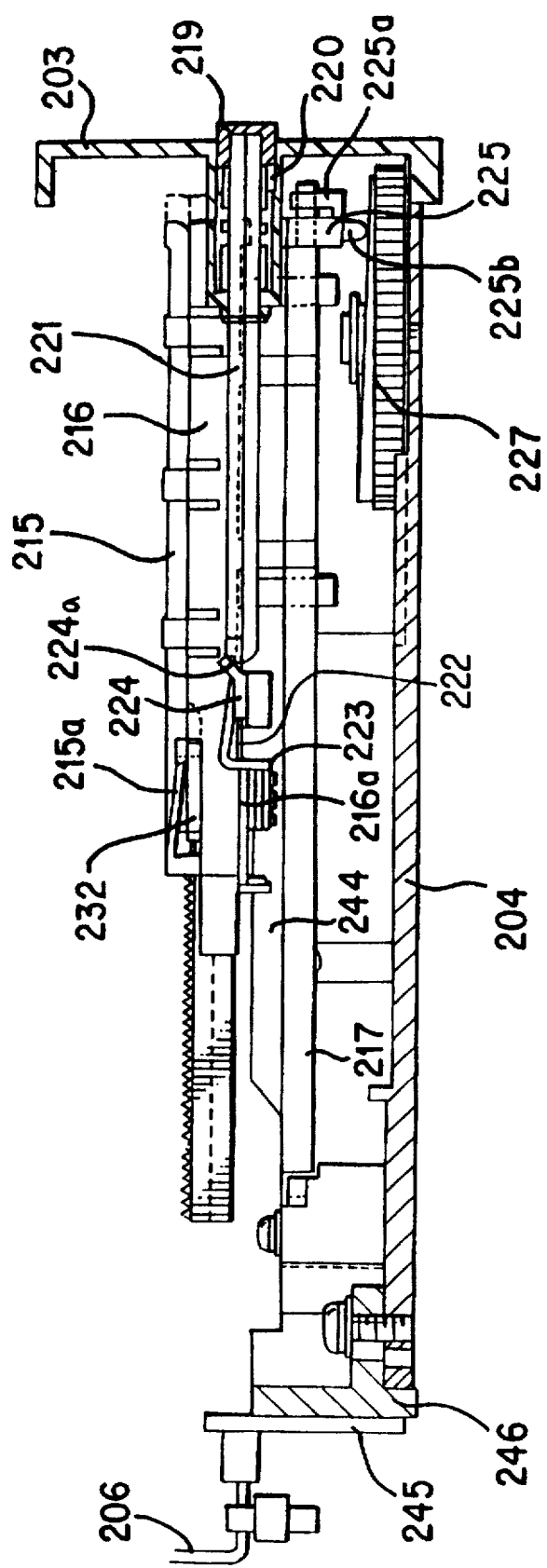
FIG. 21 is a cross section showing the second embodiment of an image input device according to the present invention, and is taken along the line 21—21 in FIG. 14.
Figure 22:
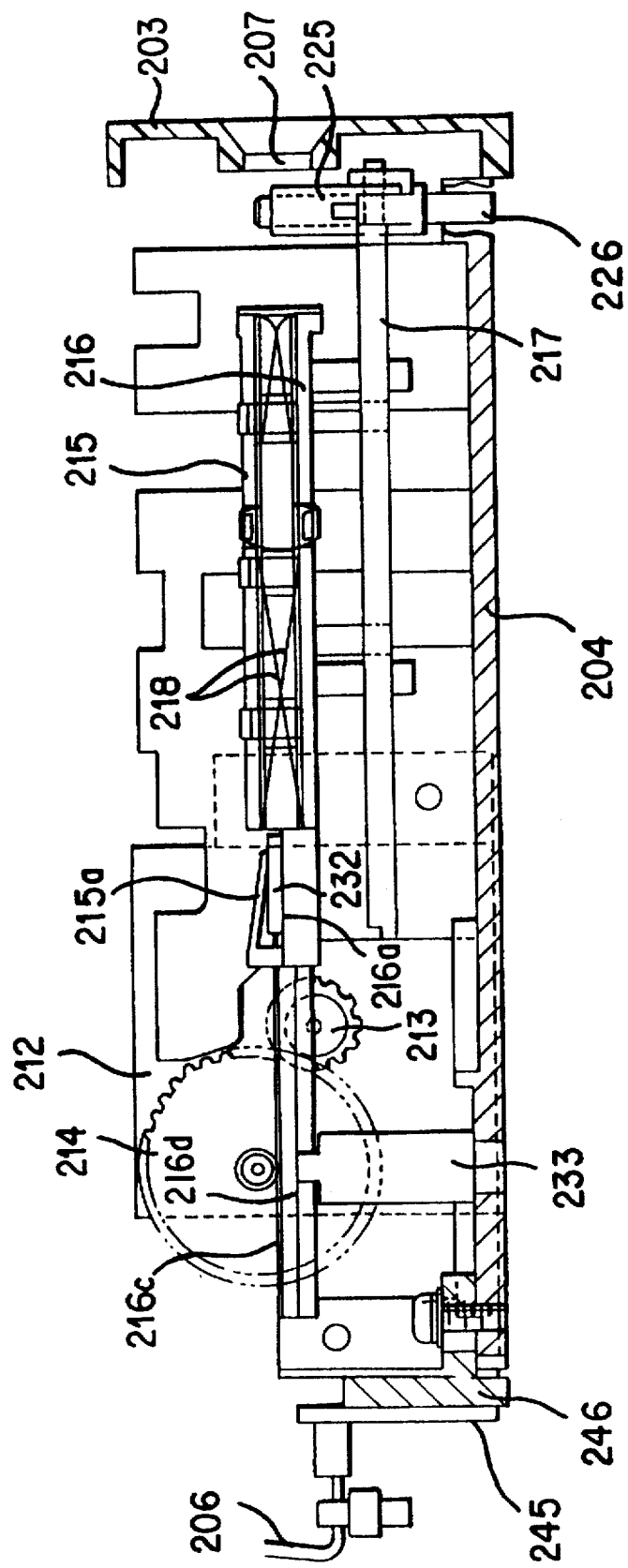
FIG. 22 is a cross section showing the second embodiment of an image input device according to the present invention, and is taken along the line 22—22 in FIG. 14.

The following is a description of the origin detection mechanism used for motion in the focusing direction and in the carriage component secondary scanning direction. The edge detection plate 232 is sandwiched between the rack carriage 216 and the carriage component 215. The protrusion 216b on the rack carriage 216 serves as a guide permitting movement of the origin detection mechanism in the focusing direction, as shown in FIG. 20. The edge detection plate 232 is pressed against the rack carriage focusing direction limiter 216a by an erect component 215a formed in a spring shape on the carriage component 215, as shown in FIGS. 20 and 22. An inclined surface 232a formed on one end of the edge detection plate 232 permits insertion of a film holder for strip films.

The origin detection component 232b of the edge detection plate 232 as shown in FIG. 20, is inclined at an angle of about 45° relative to the secondary scanning direction. It is also inclined at an angle of about 45° relative to the focusing direction. Origin detection is accomplished using this edge component 232b. The vertical section of the edge component in the focusing direction is positioned between the carriage component 215 and the rack carriage 216.

Figure 23:
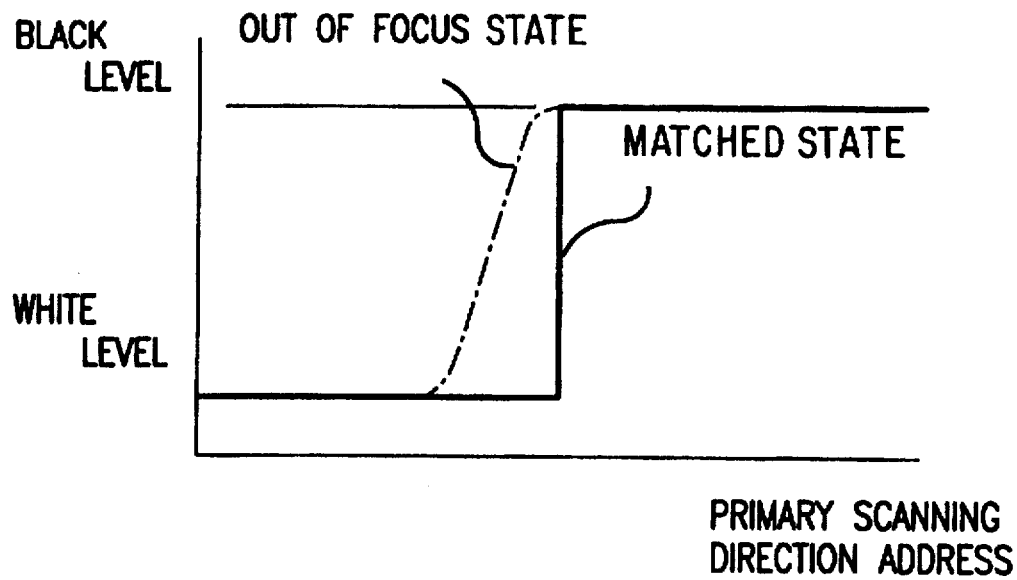
FIG. 23 is a waveform drawing explaining the action of finding the carriage position origin in the focusing direction in the image input device according to the present invention.

The following is an explanation of the principle of origin detection. First, the carriage component is moved to a position where the origin detection component 232b of the edge detection plate 232 can almost be read by the CCD 243. The AF motor 231 is then rotated and the carriages 215 and 216 are moved up or down in the focusing direction. The contrast in one line of data (i.e., the line of data read by CCD 243) is checked. At the in-focus position, as shown in FIG. 23, the change from black to white is nearly a right angle, and it becomes less inclined the more the position is shifted from this in-focus position. The origin in the focusing direction is the carriage position in the focusing direction where the most vertical change from black to white is obtained from one line of data.

Figure 24:
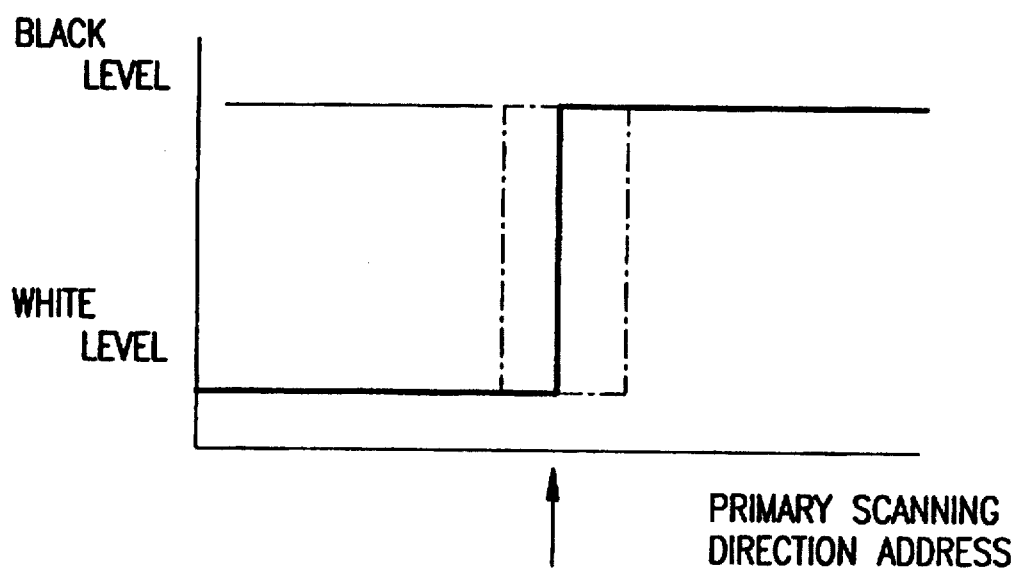
FIG. 24 is a waveform drawing explaining the action of finding the carriage position origin in the secondary scanning direction.

When the edge detection plate 232 is in-focus, origin detection can be performed in the secondary scanning direction. When the inclined surface 232b of the edge detection plate 232, which is inclined at a 45° angle from the secondary scanning direction, is read by the CCD 243, the address in the primary scanning direction where black changes to white varies with movement of the carriages 215 and 216 in the secondary scanning direction, as shown in FIG. 24. The carriage position in the secondary scanning direction that agrees with the address indicated by this primary scanning direction address is referred to as the secondary scanning direction origin of the carriages 215 and 216.

Figure 19:
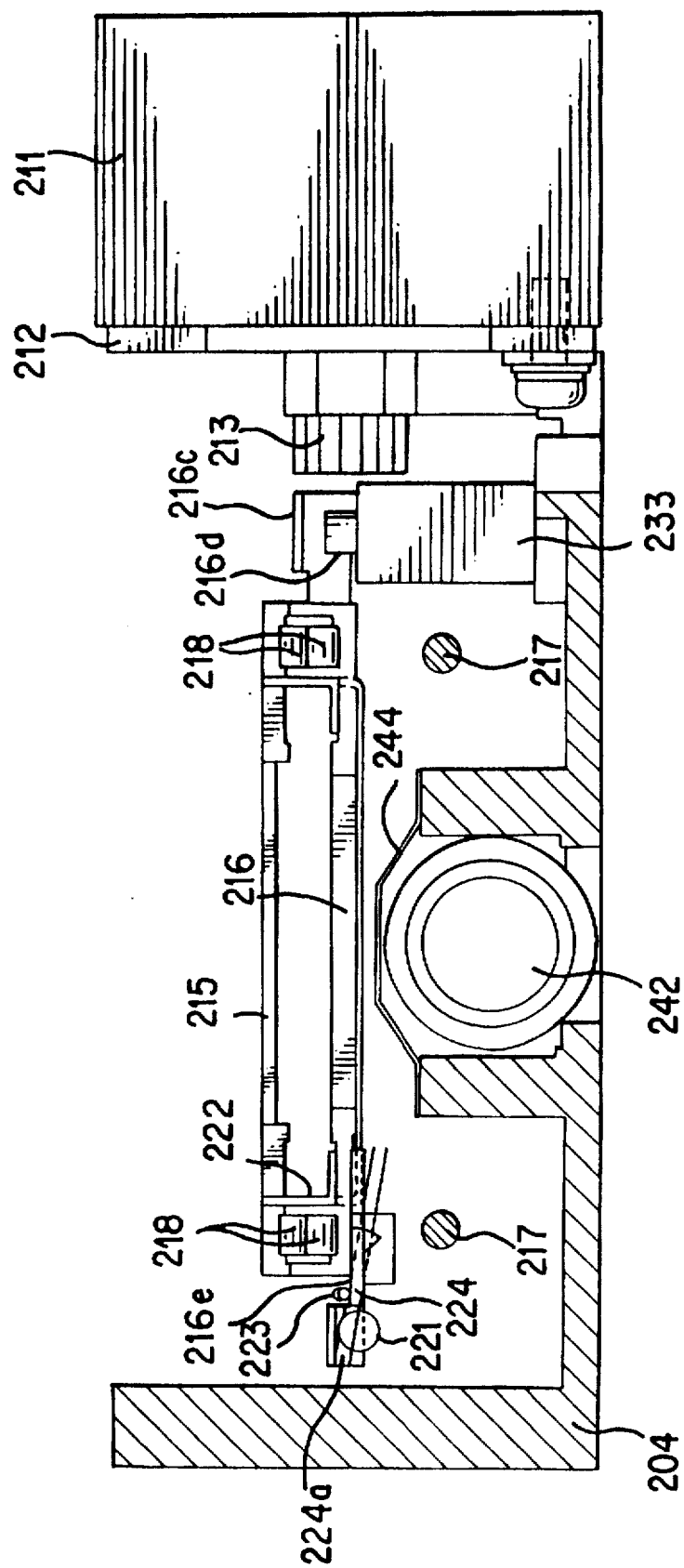
FIG. 19 is a cross section showing the second embodiment of an image input device according to the present invention, and is taken along the line 19—19 in FIG. 14.

A groove 216d, as shown in FIGS. 19 and 20, is formed in the lengthwise direction on the back side of rack 216c of the rack carriage 216. A rack support bar 233 is pressed onto the mechanical body 204 and fitting into the groove 216d allowing movement of the carriage rack 216. Through this arrangement, the camber of the rack 216c is suppressed and the fit with the pinion gear 214 is made certain.

By fixing the rack support bar 233 to the mechanical body 204, the guide bars 217 limit the movement of the rack carriage 216 in the secondary scanning direction. Consequently, it is possible to minimize positional error between the guide bars 217 and the rack carriage groove 216d. Accordingly, it becomes possible for the carriage component to move smoothly in the secondary scanning direction.

The mechanical body 204 is made from a material with good joint movement characteristics, such as a molded plastic material, so that it is possible to have the rack support bar made into a single body with the mechanical body 204.

The following is an explanation of the optical illumination component. The optical illumination component, as shown in FIG. 15, include an illumination base 236, an LED block 237, a toric mirror 238, a 40° mirror 239 and an illumination system lid 240. The entire body is fastened by a countersunk flat head screw to the mechanical body 204.

The LED block 237 includes a light source and is fixed to the top of the illumination base 236 via an insulating sheet by an insulation collar and screw. The toric mirror 238 is attached to the illumination base 236 so that the mirror can rotate around a cylindrical protrusion provided in the side surface, and is fixed by screws after the angle has been adjusted. The 40° mirror 239 is attached to a bent component formed in the illumination base 236. The illumination system lid 240 is fixed by stoppers formed in the illumination base 236 in two locations, so that the lid covers the LED block 237, the toric mirror 238 and the 40° mirror 239. Furthermore, a slit is provided above the 40° mirror 239 to allow light to pass through toward the film mount. Light from the outside incident on the inside of the illuminating optical system is blocked by the illuminating system lid 240.

As shown in FIG. 15, the projection optical component includes a 45° reflective mirror 241, a projection lens 242, a CCD 243 and a projection system lid 244. The projection optical component is positioned in the center of the bottom of the mechanical body 204 where it is shielded on three sides by walls. The 45° reflective mirror 241 is attached to the mechanical body 204. The projection lens 242 has a symmetric arrangement of six lenses in four groups fixed to the lens chamber by a separation ring and a holding ring. The lens chamber is fixed to the mechanical body 204 by a set screw. The CCD base plate 245 houses the CCD 243 and is fixed to the mechanical body 204 via the CCD holder 246. The projection system lid 244 is fixed by screws along the perimeter of the component shielded by the walls.

With the structure described above, the path of light which passes through the source document is changed 90° by the 45° reflective mirror 241. The light is then formed into an image on the CCD 243 by the projection lens 242. The CCD holder 246 also blocks light and dust. Furthermore, the projection system lid 244 blocks light and dust from reaching the projection optical system as a whole, and also functions as a suppression for the guide bars 217 of the scanning component.

With the embodiment explained above, it is possible to obtain the image of the document inside the document holder to match on the line sensor because of the presence of focusing structure. In addition, because an AF motor and cam are present, manual focus adjustment is unnecessary.

With the present embodiment described above, the document position adjustment mechanism is such that it can move the reciprocal movement guidance mechanism in the direction of the optical axis. Accordingly, it is possible to provide an image input device in which focus adjustment is possible in the direction of the optical axis of the light when the image of the document is read by forming an image from light that has passed through the document, or that has been reflected by the document.

Figure 25A:
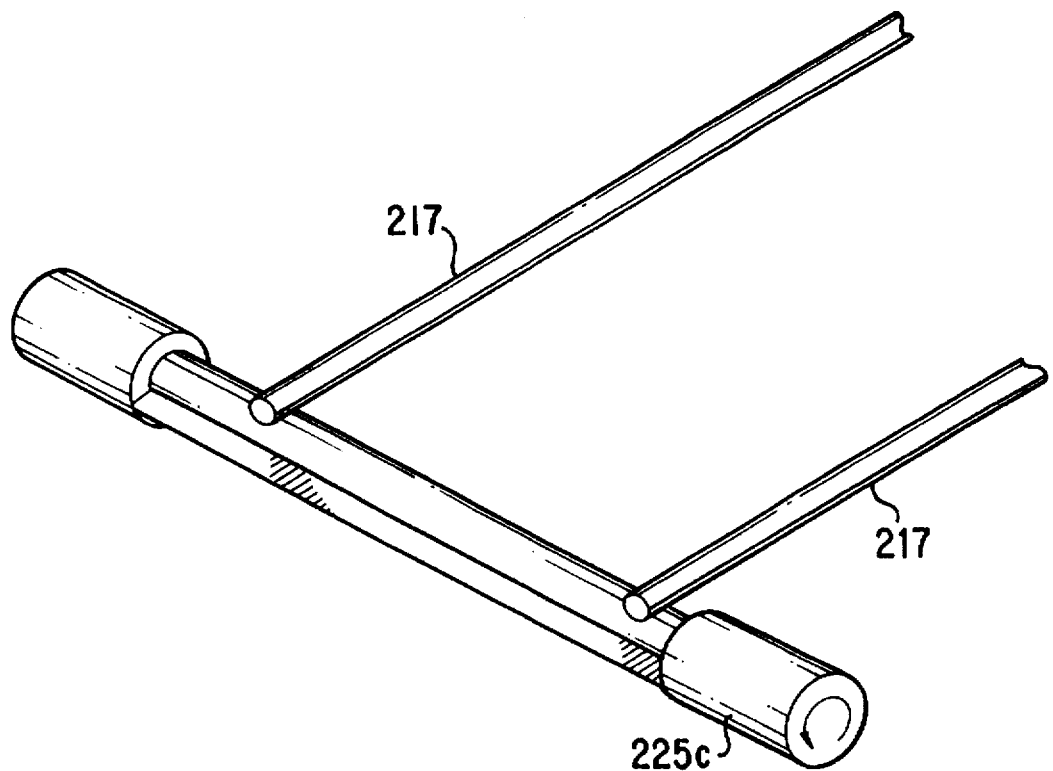
FIGS. 25a and 25b are oblique views showing a third embodiment of an image input device according to the present invention.
Figure 25B:
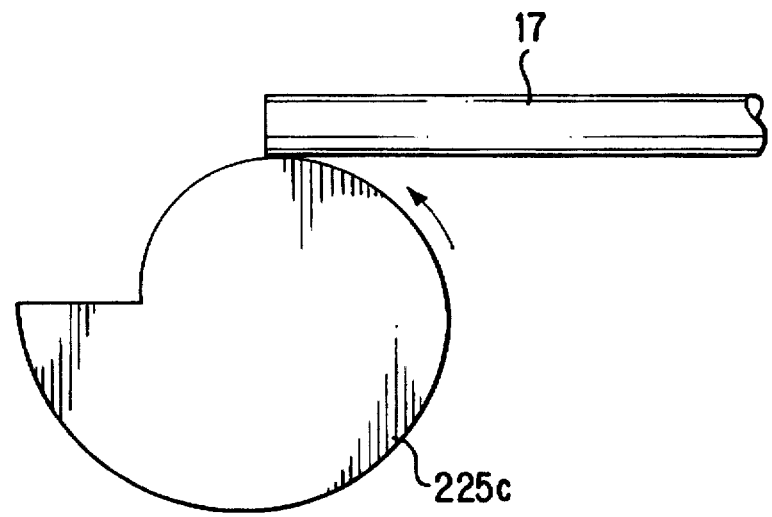

FIGS. 25a and 25b show another embodiment of the image input device according to the present invention. In the embodiment described above, the focus cam 227 included a disk-like rotational cam having a cammed upper surface. Focus adjustment was performed by moving the guide bars 217 up and down using the focus cam 227. However, in the present embodiment, as shown in FIG. 25b, a spindle-like rotational cam 225c having a perimeter surface that acts as the cam surface is provided at the position of the focus block 225. By rotating the rotational cam 225c in the direction indicated by the arrows, as shown in FIGS. 25a and 25b, focus adjustment is performed by moving the guide bars 217 up and down. With the exception of this, the structure can be same as in the embodiment described above.

Figure 26:
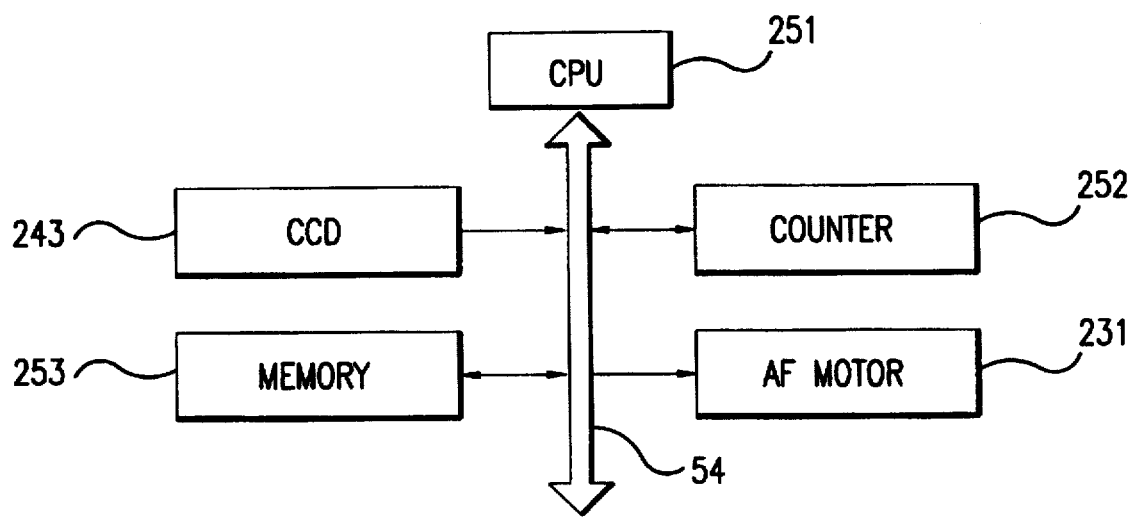
FIG. 26 is a block diagram showing another embodiment of an image input device according to the present invention.
Figure 27:
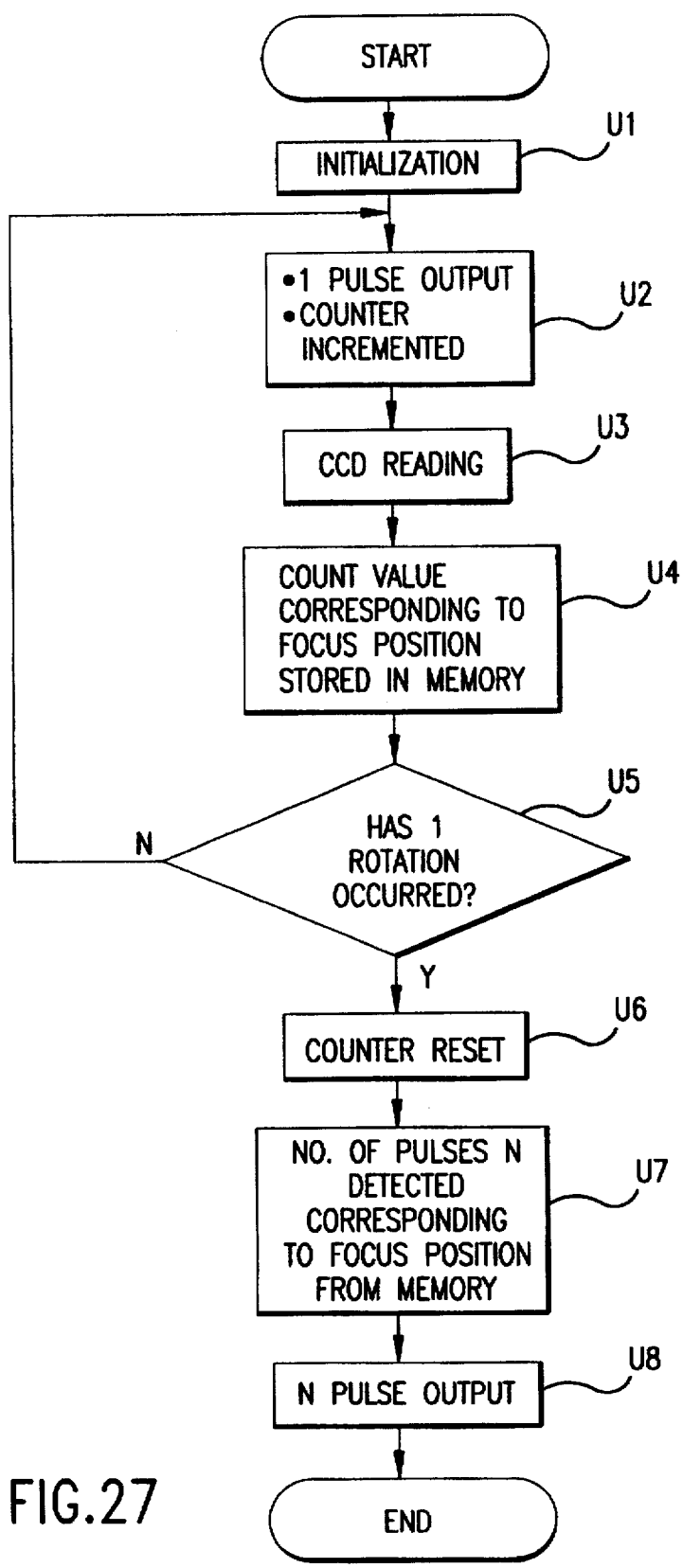
FIG. 27 is a flowchart showing a process for auto focusing according to an embodiment of the present invention.

The auto focusing action is discussed in reference to FIGS. 26–28b. FIG. 26 is a block diagram showing the components related to the auto focusing action in an image input device according to an embodiment of the present invention. In addition, FIG. 27 is a flowchart used to explain the actions of the CPU circuit 251.

In FIG. 26, the CPU circuit 251 is connected to the CCD 243, the counter 252, the memory 253 and the AF motor 231 via a bus line 254. Because the CCD 243 and AF motor 231 have already been explained above, a redundant explanation of them is omitted here. The counter 252 counts the number of pulses supplied to the AF motor 231. The memory 253 stores the count value of the counter 252 after finding a correspondence between it and the focus state.

Figure 28A:
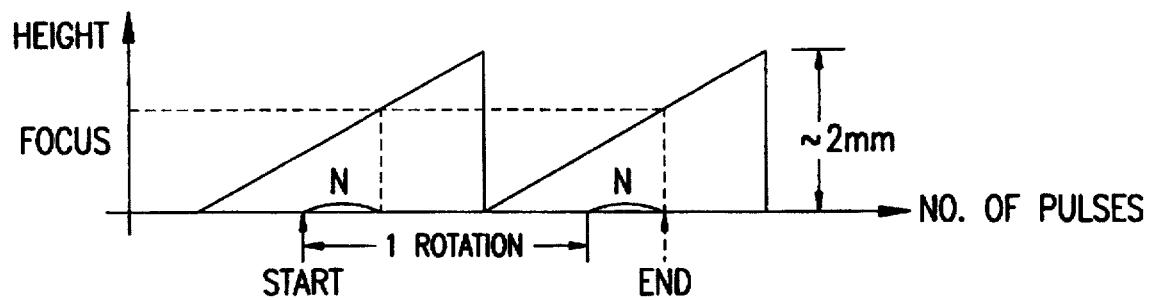
FIGS. 28a and 28b are summary drawings showing the performance of a focus detection process of embodiments of an image input device according to the present invention.

The program actions of the CPU 251 are described with reference to FIG. 27. As shown in FIG. 27, when the program starts, the counter 252 and the memory 253 are first initialized (step U1). In FIG. 28a, this process starts from the position indicated by "START". In step U2, one pulse is output to the AF motor 231 and the counter 252 is incremented. In step U3, the focus state of the optical illumination system is detected from the output of the CCD 243, as explained in FIG. 23. In step U4, the count value on the counter 252 corresponding to a match state (focus state) in FIG. 23 is stored in memory 253 during one rotation of the rotational cam 225c. In step U5, a determination is made as to whether the focus cam 227 has made one complete rotation (rotated 360°). Because the number of pulses needed for one rotation of the focus cam 227 is already known, this determination is made simple by comparing the count value on the counter 252 with the requisite number of pulses for a complete rotation (the predetermined number). When the focus cam 227 has not made one rotation, the CPU returns to step U2 and repeats steps U3 through U5.

Figure 28B:
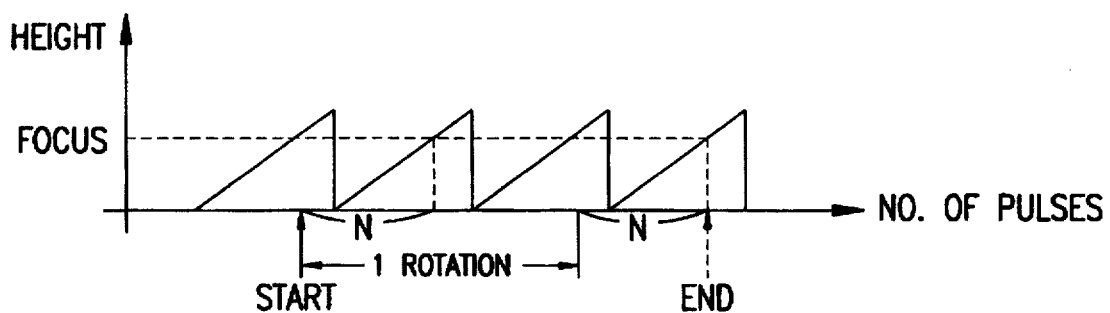

The rotational cam 225c may have multiple similar inclined portions, as shown in FIG. 28b in place of the single inclined portion of FIG. 28a.

When the focus cam 227 has made one rotation, the counter 252 is reset in step U6, and the count value of the counter 252 that corresponds to the focus position which is recorded in memory 252 is read (step U7). If the count is denoted as being the count value N, in step U8 N pulses are output to the AF motor 231 and the program is concluded. This terminal position is the position indicated by "END" in FIGS. 28a and 28b, and is a position that is removed from the "START" position by one rotation and N pulses. Because the count value N is not a predetermined value, as can be understood from FIGS. 28a and 28b, it is possible to stop the rotation of the focus cam 227 at the correct focus position (in other words, auto focusing) without detecting a predetermined starting point using a limit switch or similar device as in the prior art.

As variations of the structure described above, it is also possible for the drive means that drives rotation of the focus cam component 227 to be a direct current motor, for the position detection means that detects the rotational position of the focus cam component 227 to be a rotary encoder, and for the memory means (memory 253) to store the count values of the rotary encoder.

With the embodiment explained above, focus adjustment is possible in the direction of the optical axis of the reading light, because the device is provided with a cam component that moves the reciprocal movement guidance means (i.e., the guide bars 217 and associated structure) in the direction of the optical axis of the reading light, and with a driving means (i.e. motor 231) which drives the rotation of the cam component. In addition, because it is also equipped with a position detection means (the FIG. 27 process and hardware) that detects the position of the cam, by rotating the cam component until it matches the focus position while detecting the current position of the cam component, auto focusing can be achieved without origin detection using a limit switch or the like, thereby making it possible to simplify components and reduce costs.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image reading device for reading an image of a source document, comprising:

mounting means for supporting the source document;

an optical system for forming an image of the source document;

imaging means for scanning the image formed by the optical system in a primary scanning direction and outputting an image signal;

driving means for moving a first one of said mounting means and said imaging means in a secondary scanning direction relative to a second one of said mounting means and said imaging means, said secondary scanning direction intersecting said primary scanning direction;

control means for controlling operation of said image reading device, said control means including:

position establishment means for establishing a designated position on said source document, and focus detection means for detecting a focus position of the image of the source document based on said signal output by the imaging means at said designated position; and adjustment means for adjusting a focus of the optical system based on said focus position of the image detected by the focus detection means.

2. An image reading device according to claim 1, wherein said designated position is a single point.

3. An image reading device according to claim 1, wherein said designated position is a designated range of points, each point having a different position in at least one of the primary scanning direction and the secondary scanning direction.

4. An image reading device according to claim 1, wherein said designated position is a single point having a different position in at least one of the primary scanning direction and the secondary scanning direction.

5. An image reading device according to claim 1, wherein said control means further includes:

determination means for determining when said focus position cannot be calculated by said focus detection means for said designated position.

6. An image reading device according to claim 5, wherein said focus detection means calculates said focus position from portions of said source document in a vicinity of said designated position established by said position establishment means when said determination means determines that said focus position cannot be calculated for said designated position.

7. An image reading device according to claim 5, wherein said focus detection means calculates said focus position from an increased range in one of the primary scanning direction and the secondary scanning direction of the designated position established by said position establishment means when said determination means determines that said focus position cannot be calculated for said designated position.

8. An image reading device according to claim 5, wherein said control means further includes:

recording means for storing at least said designated position established by said position establishment means and a previous designated position, whereby when the determination means determines that the focus position cannot be calculated at said designated position, said focus detection means calculates said focus position based on the previous designated position stored in said recording means.

9. An image reading device according to claim 1, wherein said imaging means includes at least a charge-coupled device.

10. An image reading device according to claim 1, wherein said position establishment means establishes a plurality of designated positions.

11. An image reading device according to claim 1, wherein said adjustment means adjusts the focus of said optical system by moving said mounting means.

12. An image reading device for reading an image of a source document, comprising:

a transport carriage that supports the source document;

an optical system that forms an image of the source document;

a sensor that scans the image formed by the optical system in a primary scanning direction and outputs an image signal;

a drive assembly for moving a first one of said transport carriage and said sensor in a secondary scanning direction relative to a second one of said transport carriage and said sensor, said secondary scanning direction intersecting said primary scanning direction;

a control circuit that controls operation of said image reading device, said control circuit including:

a position establishing circuit that establishes a designated position on said source document, and a focus detection circuit that detects a focus position of the image based on said signal output by the sensor at said designated position; and a position adjustment assembly that adjusts a focus of the optical system based on said focus position detected by the focus detection circuit.

13. An image reading device according to claim 12, wherein said control circuit determines when said focus position cannot be calculated by said focus detection circuit for said designated position.

14. An image reading device according to claim 13, wherein said focus detection circuit calculates said focus position from portions of said source document in a vicinity of said designated position established by said position establishing circuit when said control circuit determines that said focus position cannot be calculated for said designated position.

15. An image reading device according to claim 13, wherein said focus detection circuit calculates said focus position from an increased range in one of the primary scanning direction and the secondary scanning direction of the designated position established by said position establishing circuit when said control circuit determines that said focus position cannot be calculated for said designated position.

16. An image reading device according to claim 13, wherein said control circuit further includes:

a memory for storing said designated position established by said position establishing circuit and a previous designated position, whereby when the control circuit determines that the focus position cannot be calculated at said designated position, then said focus detection circuit calculates said focus position based on the previous designated position stored in said memory.

17. An image reading device according to claim 12, wherein said sensor includes a charge-coupled device.

18. An image reading device for reading an image of a source document, comprising:

a document mount that holds the source document;

a light source that emits light, said emitted light striking said source document while traveling along an optical axis;

an optical system for forming an image of said source document;

an imaging device that reads the image formed by the optical system and outputs an image signal; and an adjustment mechanism including a cam, said cam changes a position of one of said optical system and said document mount relative to said optical axis.

19. A device according to claim 18, wherein said light source forms a line of light on the source document extending in a primary scanning direction, and said document mount and said imaging device are movable relative to each other in a secondary scanning direction intersecting to the primary scanning direction.

20. A device according to claim 19, wherein said document mount is movable in said secondary scanning direction.

21. A device according to claim 20, wherein said document mount includes a reciprocal guidance assembly having a pair of guide rods, each guide rod having one end that actsb 57428591.001 as a center of rotation, and an engagement assembly located on another end opposite said one end, said engagement assembly engaging said cam surface of said cam.

22. A device according to claim 21, wherein said cam includes at least one depression for receiving said engagement assembly of said pair of guide rods.

23. A device according to claim 19, wherein said imaging device includes an image reading device that receives light from the source document to produce an output signal.

24. A device according to claim 23, wherein said reading device includes a charge-coupled device.

25. A device according to claim 23, wherein said adjustment mechanism further includes a driving assembly linked to said cam for rotating said cam.

26. A device according to claim 18, wherein said cam includes a disk having a cam surface extending along an outer periphery of said disk.

27. A device according to claim 18, wherein said cam extends through a housing of said device so that said cam can be manually rotated from outside said housing.

28. A device according to claim 18, further comprising:
a controller including:
- a position detection circuit that detects a focusing position of said cam;
- a focus state detection circuit that detects a focusing state of said image reading device based upon said image signal; and
- a memory that records the focusing position detected by said position detection circuit, wherein when said adjustment mechanism moves the document mount, the focusing position of the cam is stored in said memory when said focus state detection circuit detects the focusing state of the imaging device.

29. A device according to claim 28, wherein said controller includes:
- a focusing control circuit that controls said adjustment mechanism, said focusing control circuit causing the adjustment mechanism to rotate said cam member at least one full turn.

30. A device according to claim 29, wherein the adjustment mechanism includes a pulse motor and said position detection circuit includes a counter that counts the pulses that drive the pulse motor and the memory stores the count values of the counter.

31. An image reading device according to claim 18, wherein said adjustment mechanism is engaged with said document mount, the adjustment mechanism changing a position of said document mount using said cam.

32. A method of reading an image of a source document in an image reading device having a document mount for supporting the source document, an optical system forming an image of the source document, an imaging device for scanning the image formed by the optical system in a primary scanning direction, and an adjustment mechanism that adjusts a focus of the optical system, said method comprising the steps of:
- establishing a designated position on said source document;
- detecting a focus position of said image of said source document based on a signal output by said imaging device at said designated position; and
- adjusting a focus of the optical system based on the detected focus position.

33. A method according to claim 32, wherein the step of establishing said designated position includes establishing multiple designated points.

34. A method according to claim 32, wherein the step of establishing said designated position includes establishing a designated range of points at said designated position.

35. A method according to claim 32, wherein the step of establishing said designated position includes establishing a single point.

36. A method according to claim 32, further comprising the step of:
- determining if a focus position can be calculated for said designated position.

37. A method according to claim 36, wherein when the focus position cannot be calculated for said designated position, the method further comprising the step of:
- calculating the focus position from portions of said source document in a vicinity of said designated position.

38. A method according to claim 36, wherein when the focus position cannot be calculated for said designated position, the method further comprising the steps of:
- increasing a designated range of said designated position in the primary scanning direction and in the secondary scanning direction; and
- determining whether the focus position can be calculated for the increased designated range of said designated position.

39. A method according to claim 36, further comprising the step of:
- recording said designated position and a previous designated position; and
- when the focus position cannot be calculated at said designated position, then calculating the focus position based on the previous designated position.

* * * * *

UNITED STATES PATENT AND TRADEMARK OFFICE
CERTIFICATE OF CORRECTION

PATENT NO. : 5,742,326
DATED : April 21, 1998
INVENTOR(S) : Kumiko MATSUI et al.

It is certified that error appears in the above-indentified patent and that said Letters Patent is hereby corrected as shown below:

On the cover page, section [75], line 5, delete

"Toshiya Aikawa, Yokohama;"

In the claims:

Delete claims 18-31

Signed and Sealed this

Twenty-ninth Day of June, 1999

Attest:

Q. TODD DICKINSON

*Attesting Officer*     *Acting Commissioner of Patents and Trademarks*